United States Patent [19]

Omuro et al.

[11] Patent Number: 5,241,534
[45] Date of Patent: Aug. 31, 1993

[54] REROUTING AND CHANGE-BACK SYSTEMS FOR ASYNCHRONOUS TRANSFER MODE NETWORK

[75] Inventors: Katsumi Omuro; Tatsuru Nakagaki; Ryuji Hyodo; Tetsuo Nishino, all of Kawasaki, Japan

[73] Assignee: Fujitsu Limited, Kanagawa, Japan

[21] Appl. No.: 716,718

[22] Filed: Jun. 17, 1991

[30] Foreign Application Priority Data

| Jun. 18, 1990 | [JP] | Japan | 2-159219 |
| Aug. 8, 1990 | [JP] | Japan | 2-211194 |
| Oct. 19, 1990 | [JP] | Japan | 2-280889 |

[51] Int. Cl.⁵ .................................... H04L 1/22
[52] U.S. Cl. ........................ 370/16; 340/827; 455/8
[58] Field of Search ............... 370/14, 16, 110.1; 375/38, 40; 455/8, 52.1; 340/825.01, 827; 371/8.2

[56] References Cited

U.S. PATENT DOCUMENTS

| 4,417,348 | 11/1983 | Abbruscato | 455/8 |
| 4,985,904 | 1/1991 | Ogawara | 455/8 |
| 4,999,829 | 3/1991 | Fite, Jr. et al. | 370/16 |
| 5,010,550 | 4/1991 | Hirata | 370/16 |

FOREIGN PATENT DOCUMENTS

| 1-101047 | 4/1989 | Japan . |
| 1-300648 | 12/1989 | Japan . |
| 2-206258 | 8/1990 | Japan . |

*Primary Examiner*—Benedict V. Safourek
*Attorney, Agent, or Firm*—Nikaido, Marmelstein, Murray & Oram

[57] ABSTRACT

A change-back system is designed for an asynchronous transfer mode network in which a rerouting path is set to replace an original path when a fault is generated in the original path within the network, which network includes a plurality of communication nodes which are coupled via lines and communicate information in the form of cells, and the original path and the rerouting path couple first and second communication nodes within the network. The change-back system makes a change-back process to change the path used from the rerouting path to the original path when the fault is restored. The change-back system includes a first circuit for detecting a restoration of a fault in the original path, a second circuit for transmitting a cell from the first communication node to the second communication node via each of the rerouting path and the original path when the restoration of the fault is detected, prior to making the change-back process, and for measuring a first time it takes for the cell to travel through the rerouting path and a second time it takes for the cell to travel through the original path, and a third circuit for calculating a guard time which is a difference between the first and second times and for delaying transmission of a cell from the second circuit to the original path after the restoration of the fault, so that the cell after the restoration of the fault is transmitted to the original path at least after a time which corresponds to the difference from a time when a cell is last transmitted to the rerouting path immediately before the fault is restored.

19 Claims, 27 Drawing Sheets

FIG. 27

| PRIMARY FACTOR / STATE | RECEIVE FAULT CELL / PEIMITIVE RECEPTION | T1 UP / 1 (s) | RECEIVE REROUTING CELL / PEIMITIVE RECEPTION | RECEIVE RESTORATION CELL / PEIMITIVE RECEPTION | RECEIVE CHANGE-BACK CELL / PEIMITIVE RECEPTION |
|---|---|---|---|---|---|
| I<br>NORMAL | REROUTING PROCESS TRANSMIT REROUTING CELL START T1 ⇒ II | TRANSMIT CHANGE-BACK CELL ⇒ I | REROUTING PROCESS TRANSMIT REROUTING CELL START T1 ⇒ IV | IGNORE | IGNORE |
| II<br>REROUTING NOTIFICATION WAITING CELL 1 | IGNORE | TRANSMIT REROUTING CELL START T1 ⇒ III | STOP T1 TRANSMIT REROUTING CELL RESTART T1 ⇒ IV | IGNORE | IGNORE |
| III<br>REROUTING WAITING CELL 2 | IGNORE | RESTORATION PROCESS ⇒ VII | STOP T1 TRANSMIT REROUTING CELL ⇒ IV | IGNORE | IGNORE |
| IV<br>REROUTING COMPLETE | IGNORE | TRANSMIT REROUTING CELL ⇒ IV | IGNORE | RESTORATION PROCESS TRANSMIT CHANGE-BACK CELL START T1 ⇒ V | RESTORATION PROCESS TRANSMIT CHANGE-BACK CELL START T1 ⇒ I |
| V<br>CHANGE-BACK WAITING CELL 1 | IGNORE | TRANSMIT CHANGE-BACK CELL START T1 ⇒ VI | IGNORE | IGNORE | STOP T1 TRANSMIT CHANNGE-BACK CELL RESTART T1 ⇒ I |
| VI<br>CHANGE-BACK WAITING CELL 2 | IGNORE | REROUTING PROCESS ⇒ VII | IGNORE | IGNORE | STOP T1 TRANSMIT CHANGE-BACK CELL ⇒ I |
| VII<br>REROUTING FAIL CHANGE-BACK FAIL | REROUTING PROCESS TRANSMIT REROUTING CELL START T1 ⇒ II | — | IGNORE | RESTORATION PROCESS TRANSMIT CHANGE-BACK CELL START T1 ⇒ V | IGNORE |

FIG. 28

| PRIMARY FACTOR / STATE | HEC NON-SYNC STATE | T1 UP 200[ms] | HEC SYNC RESTORED STATE | T2 UP 1[s] | T3 UP 10[s] |
|---|---|---|---|---|---|
| I NORMAL | START T1 ⇨ II | — | — | — | — |
| II PROTECTING | — | TRANSMIT FAULT CELL START T2 ⇨ III | STOP T1 ⇨ I | — | — |
| III ABNORMAL 1 | IGNORE | — | IGNORE | RE-TRANSMIT FAULT CELL ⇨ IV | — |
| IV ABNORMAL 2 | IGNORE | — | START T3 ⇨ V | — | — |
| V WAITING RESTORATION 1 | STOP T3 ⇨ IV | — | IGNORE | — | RE-TRANSMIT RESTORATION CELL START T2 ⇨ VI |
| VI WAITING RESTORATION 2 | STOP T4 START T1 ⇨ II | — | IGNORE | RE-TRANSMIT RESTORATION CELL ⇨ I | — |

REROUTING AND CHANGE-BACK SYSTEMS FOR ASYNCHRONOUS TRANSFER MODE NETWORK

BACKGROUND OF THE INVENTION

The present invention generally relates to rerouting and change-back systems, and more particularly to a rerouting system and a change-back system for an asynchronous transfer mode (ATM) network which is used in a high-speed broadband integrated services digital network (B-ISDN).

The "rerouting" of the communication path via communication nodes of the ATM network is also referred to as "alternative routing", but the term "rerouting" will be used in this specification. In addition, the "change-back" of the communication path via the communication nodes of the ATM network is also referred to as "reverse of rerouting", but the term "change-back" will be used in this specification. The rerouting is made from an original communication path to a temporary or rerouting communication path when a fault occurs in a line of the original communication path, for example. The change-back is made from the rerouting communication path to the original communication path after the fault is restored.

FIG. 1 generally shows an example of an ATM network. ATM communication nodes 51, 52 and 53 of the ATM network are coupled via real lines. Channels A1 and A2 are allocated for a user $A_1$ who is connected to the node 51 and to a user $A_2$ who is connected to the node 52. Channels B1 and B2 are allocated for a user $B_1$ who is connected to the node 51 and to a user $B_2$ who is connected to the node 52. Similarly, channels C1 and C2 are allocated for a user $C_1$ who is connected to the node 51 and to a user $C_2$ who is connected to the node 53.

Information a1, a2, a3 and b1 transmitted from the users $A_1$ and $B_1$ are divided into cells in the node 51, where each cell is an information transfer unit of the ATM. Hence, the cells are multiplexed and transmitted on the real line between the nodes 51 and 52, that is, on the original path which is allocated beforehand. The multiplexed cells include channel identifiers A and B at header parts thereof, and the node 52 identifies the transmitting channels A1 and A2 and the transmitting channels B1 and B2 respectively based on the channel identifiers A and B. As a result, the information field parts a1, a2 and a3 are transmitted to the user $A_2$ and the information field part b1 is transmitted to the user $B_2$. Information c1 transmitted from the user $C_1$ is similarly transmitted on the real line between the nodes 51 and 53, that is, on the original path which is allocated beforehand, and is transmitted to the user $C_2$.

The header part of the cell also includes an identifier related to the rerouting path which is to be used when a fault occurs in the real line between the nodes. For example, when the path between the nodes 51 and 52 is regarded as the original path, it is possible to allocate beforehand a rerouting path between the nodes 51 and 52 via the node 53. In other words, a virtual network formed by virtual paths and virtual channels can be formed in the network which is made up of the real lines.

When the ATM network shown in FIG. 1 is regarded as the virtual network, the channels A1 and A2 becomes virtual channels A1 and A1 within a virtual path 54 or virtual channels A1 and A2 within a virtual path 55. Hence, the users $A_1$ and $A_2$ cannot see and do not need to be conscious of the virtual channels.

When a line fault occurs, for example, the rerouting of the path is made. And when the line fault is restored, the change-back of the path is made.

FIG. 2 shows an example of a conventional rerouting processing unit 60. In FIG. 2, a fault monitoring part 61 detects the generation of the fault and the fault restoration in the virtual path which is coupled to the node. The fault monitoring part 61 notifies to a cell transmission/reception processing part 62 the restored original path in which the fault restoration is made.

The cell transmission/reception processing part 62 manages the virtual paths and the virtual channels at the node. The transmission/reception processing part 62 changes the path in which the cell is transmitted from the rerouted path to the original path and thereafter transmits the cells to the destination using the original path when the restoration of the line is notified from the fault monitoring part 61. In other words, the change-back from the rerouted path to the original path is made immediately when the restoration of the original path is detected.

Generally, the number of nodes in the rerouted path is greater than the number of nodes in the original path. For this reason, the cell which is transmitted via the rerouted path immediately before the change back may arrive at the destination node after the cell which is transmitted via the original path after the change-back. In other words, the order of the cells may become reversed at the destination node immediately after the change-back is made, and in this case an error is generated in the transmitted information.

Unlike the conventional packet switching system, the ATM network is designed to increase the transfer speed of information as much as possible, and for this purpose, the protocol process on the network side is simplified and the switching of the cells is made by hardware. Therefore, no measures are conventionally taken in the ATM network even when the error is generated in the transmitted information after the change-back, and the measures against the error are taken on the user side by use of an error control protocol process.

Therefore, there is a demand to realize a change-back system which can positively prevent the order of the cells from being disrupted immediately after the change-back is made to change back the path from the rerouted path to the original path which is used before the rerouting.

On the other hand, FIG. 3 shows an example of a conventional broadband ISDN. Five nodes 1 coupled via links 2 respectively operate in the ATM mode. A network management part 3 is provided in common to each of the nodes 1, and this network management part 3 is coupled to the nodes 1 via communication lines 5. The link 2 which couples the nodes 1-i and 1-j will be denoted by 2-ij, and the communication line 5 which couples the network management part 3 and the node 1-i will be denoted by 5-i, where i=1, ..., 5, j=1, ... , 5 and i=j in this example.

It will be assumed for the sake of convenience that a terminal 4-1 which is connected to the node 1-1 is coupled to a terminal 4-3 which is connected to the node 1-3 via the node 1-1, the link 2-12, the node 1-2, the link 2-23 and the node 1-3, that is, via a logic path VP1. When a fault occurs in the link 2-23 which couples the nodes 1-2 and 1-3 during a communication via this logic path VP1, the nodes 1-2 and 1-3 respectively detect via the link 2-23 that signals from the nodes 1-3 and 1-2 stop. Hence, the nodes 1-2 and 1-3 notify the network management part 3 via the respective communication lines 5-2 and 5-3 that the communication is interrupted.

The network management part 3 manages the rerouting paths for the paths among all of the nodes 1 within the broadband ISDN. Hence, when the network management part 3 is notified from the nodes 1-2 and 1-3 that the communication is interrupted, the network management part 3 notifies the rerouting path (logic path after the rerouting) for the original path (logic path before the rerouting) which passes the link 2-23 to all of the nodes 1 which may set a logic path via the link 2-23 before the rerouting. In other words, the network management part 3 instructs the nodes 1 to carry out a rerouting process for the call which is being set.

For example, the network management part 3 transmits to the node 1-1 via the communication line 5-1 a logic path VP2 which is to be used in place of the logic path VP1 after the rerouting together with a rerouting instruction which instructs the node 1-1 to carry out the rerouting process. In this case, the logic path VP2 extends from the node 1-1 to the node 1-3 via the link 2-14, the node 1-4, the link 2-45, the node 1-5 and the link 2-35.

Each node 1 which receives the logic path used before the rerouting, the logic path used after the rerouting and the rerouting instruction carries out a rerouting process to reset all of the calls which are set via the logic path used before the rerouting to the logic path used after the rerouting.

For example, when the node 1-1 receives the logic path VP1 used before the rerouting, the logic path VP2 used after the rerouting and the rerouting instruction, the node 1-1 detects the calls which are set via the logic path VP1 used before the rerouting. In this case, when the node 1-1 detects a call which is set between the terminals 4-1 and 4-3, the node 1-1 releases the logic path VP1 related to this detected call and resets the logic path VP2 which is to be used after the rerouting. Thereafter, the terminals 4-1 and 4-3 continue the communication via the logic path VP2.

As described above, when the communication via an arbitrary link 2 is interrupted in the broadband ISDN, this interruption is notified to the network management part 3. In addition, the network management part 3 sends the rerouting instruction to all of the related nodes 1 so that the calls which are set via the original logic path used before the rerouting are reset to the logic path used after the rerouting by the rerouting process of each of the nodes 1. As a result, there is a problem in that the rerouting process takes a long time to complete.

Therefore, there is a demand to realize a rerouting system which can carry out the rerouting process within a relatively short time.

As described above, it is important to quickly detect a fault in the transmission path and to reserve a rerouting path so that a communication of a high quality can always be made. In addition, when fault is restored, it is necessary to quickly detect the recovered path and change back the path to the recovered path so that the recovered path can be utilized efficiently for the communication. Furthermore, there is a demand to realize in the general communication network or the switching network a network for making an intercomputer communication, including a communication between a host computer and a terminal. In this case, measures must be taken so that even when a fault occurs within the network the fault cannot be recognized by the external computer.

FIG. 4 is a diagram for explaining a method of detecting a fault between two nodes A and B in an example of a conventional synchronous transfer mode (STM) time division multiplexing (TDM) transmission system. A command is transmitted from the node A to the node B, and a corresponding response is transmitted from the node B to the node A. A timer is started after transmitting the command, and a fault is detected in the line between the nodes A and B if the response from the node B is not received within a specific time T1. A rerouting process is carried out when the fault is detected.

However, the following problems occur when carrying out the rerouting process in the conventional STM TDM transmission system. First, when a relay node exists, it is impossible to notify the need for the rerouting to the destination node. For this reason, the rerouting can only be realized between two adjacent nodes. Second, the phenomenon which is generated by the disconnected line such as the generation of consecutive "1"s on the transmission path cannot be distinguished from the original data. As a result, the disconnection of the line must actually be detected by other means such as a command/response used for the monitoring the line. Accordingly, the time it takes from a time when the disconnection of the line occurs to a time when the rerouting process is actually carried out is relatively long.

On the other hand, when the rerouting is considered in the case of the ATM network based on the prior art, the problems described in conjunction with FIG. 5 occur.

In the case of the ATM network, the data are transmitted in units of cells as described before. When the ATM network includes nodes A, B and C as shown in FIG. 5 and a disconnection occurs in the line between the nodes A and B, for example, the nodes A and B can detect the disconnection of the line. However, the node C cannot detect the disconnection of the line between the nodes A and B because each node has the functions of relaying and switching the cells within the ATM network and empty (or dummy) cells are transmitted from the node B to the node C even when the disconnection occurs in the line between the nodes A and B. In other words, the node C cannot determine whether the empty cells are received because there is no data or because the line between the nodes A and B is disconnected.

Furthermore, it is difficult to quickly change back the path within the ATM network from the rerouting path to the original path after the disconnection is restored for reasons similar to those described above.

Therefore, there is a demand to realize a rerouting system which can quickly detect the disconnection and start the rerouting process, and also notify the disconnection to a node on the end of the path. In addition, there is a demand to realize a change-back system which can quickly change back the path from the rerouted path to the original path after the disconnection is restored.

SUMMARY OF THE INVENTION

Accordingly, it is a general object of the present invention to provide a novel and useful rerouting system and a change-back system for an ATM network, in which the problems described above are eliminated and the demands described above are satisfied.

Another and more specific object of the present invention is to provide a change-back system for an asynchronous transfer mode network in which a rerouting path is set to replace an original path when a fault is generated in the original path within the network, the network including a plurality of communication nodes which are coupled via lines and communicate information in the form of cells, the original path and the rerouting path coupling first and second communication nodes within the network, the change-back system making a change-back process to change the path used from the rerouting path to the original path when the fault is restored, the change-back system comprising first means for detecting a restoration of a fault in the original path, second means, coupled to the first means, for transmitting a cell from the first communication node to the second communication node via each of the rerouting path and the original path when the first means detects the restoration of the fault prior to making the change-back process and for measuring a first time it takes for the cell to travel through the rerouting path and a second time it takes for the cell to travel through the original path, and third means, coupled to the first and second means, for calculating a guard time which is a difference between the first and second times and for delaying transmission of a cell from the second means to the original path after the restoration of the fault, so that the cell after the restoration of the fault is transmitted to the original path at least after a time which corresponds to the difference from a time when a cell is last transmitted to the rerouting path immediately before the fault is restored. According to the change-back system of the present invention, it is possible to prevent the order of the cells from being disordered at the destination node by use of a simple protocol of the communication node. For this reason, it is possible to suppress quality deterioration of the communication without affecting the high-speed information transfer within the network. In addition, it is possible to grasp the state of the network from the measured delay times of each of the paths.

Still another object of the present invention is to provide a rerouting system for an asynchronous transfer mode network in which a rerouting path is set to replace an original path when a fault is generated in the original path within the network, the network including a plurality of communication nodes which are coupled via lines and communicate information in the form of cells, the original path and the rerouting path coupling first and second communication nodes within the network, the rerouting system comprising first means for detecting a fault in an arbitrary line of the original path between the first and second communication nodes, second means, coupled to the first means, for making a fault notification to all nodes which may set a call via the arbitrary line of the original path in which the fault is detected by the first means, and third means, coupled to the second means, for resetting a call which is made via the arbitrary line to use the rerouting path when the fault notification is received. According to the rerouting system of the present invention, it is possible to quickly carry out the rerouting process for the call which is set.

A further object of the present invention is to provide a rerouting and change-back system for an asynchronous transfer mode network in which a rerouting path is set to replace an original path when a fault is generated in the original path within the network and a change-back is made to change the path used from the rerouting path to the original path when the fault is restored, the network including a plurality of communication nodes which are coupled via lines and communicate information in the form of cells, the original path and the rerouting path coupling first and second communication nodes within the network, the rerouting and change-back system comprising first means for transmitting a maintenance cell which notifies a fault to the communication nodes when a fault is detected in an arbitrary line of the original path, and for transmitting a maintenance cell which notifies a fault restoration to the communication nodes when a restoration of the fault in the arbitrary line is detected, second means, coupled to the first means, for making the rerouting when a received maintenance cell notifies the fault, and for making a change-back when a received maintenance cell notifies the fault restoration, and third means, coupled to the second means, for transmitting a maintenance cell which notifies the rerouting to the communication nodes when the second means makes the rerouting, and for transmitting a maintenance cell which notifies the change-back when the second means makes the change-back. According to the rerouting and change-back system of the present invention, it is possible to realize a high-speed rerouting/change-back which can be completed within a few seconds. Therefore, the rerouting is completed during the re-transmission state of layer 2 (data link layer) particularly in the case of a communication between computers, and a large fault such as a disconnection of a session can be prevented. As a result, the quality of the communication within the network can be improved.

Other objects and further features of the present invention will be apparent from the following detailed description when read in conjunction with the accompanying drawings.

BRIEF DESCRIPTION OF THE DRAWINGS

FIG. 27 is a diagram for explaining a state transition of an adaptation layer and ATM layer processing part of each node; and FIG. 28 is a diagram for explaining a state transition of a cross connect part of each node.

DESCRIPTION OF THE PREFERRED EMBODIMENTS

Figure 6:
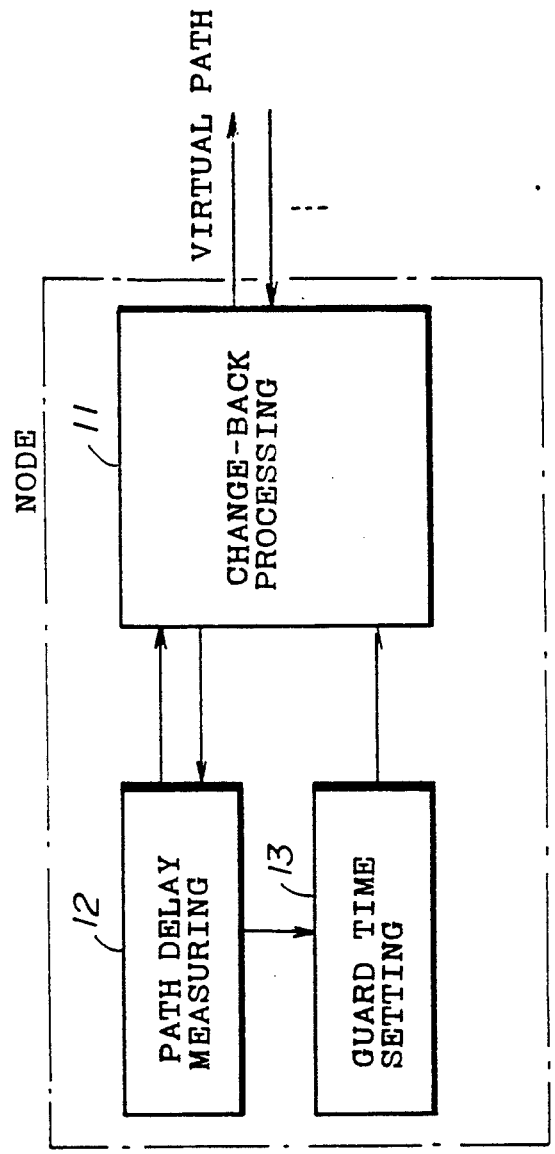
FIG. 6 is a system block diagram for explaining an operating principle of a change-back system according to the present invention.

A description will be given of an operating principle of a change-back system according to the present invention, by referring to FIG. 6. In FIG. 6, a change-back processing apparatus 11 sets a rerouting path which is to be used in place of an original path when a fault occurs in a line of an ATM network, for example. After the fault in the line of the ATM network is restored and the fault restoration is detected, the change-back processing apparatus 11 changes back the path from the rerouting path to the original path.

Prior to the change-back process which is carried out when the restored state is detected, a path delay measuring part 12 sends a cell to the rerouting path and the original path and measures the transmission delay time in each of the rerouting path and the original path. In other words, the path delay measuring part 12 measures the time it takes for the cell to travel via the rerouting path and the time it takes for the cell to travel via the original path.

A guard time setting part 13 obtains a difference between the the transmission relay times in the rerouting path and the original path, and sets the difference as a guard time. The guard time is notified to the change-back processing apparatus 11. The timing with which the cells are transmitted to the original path after the change-back is made is delayed by this guard time.

The change-back processing apparatus 11 carries out the change-back process when the line restoration is made, but the timing with which the first cell is transmitted to the original path after the change-back is delayed by the guard time from the time when the last cell is transmitted to the rerouting path before the change-back. The second and subsequent cells transmitted to the original path after the change-back are transmitted after the first cell without being delayed by the guard time. In other words, by the provision of the guard time, it is possible to positively prevent the cell which is transmitted via the original path immediately after the change-back from reaching the destination before the cell which is transmitted via the rerouting path immediately before the change-back. Hence, the original order of the cells is guaranteed at the destination.

Figure 7:
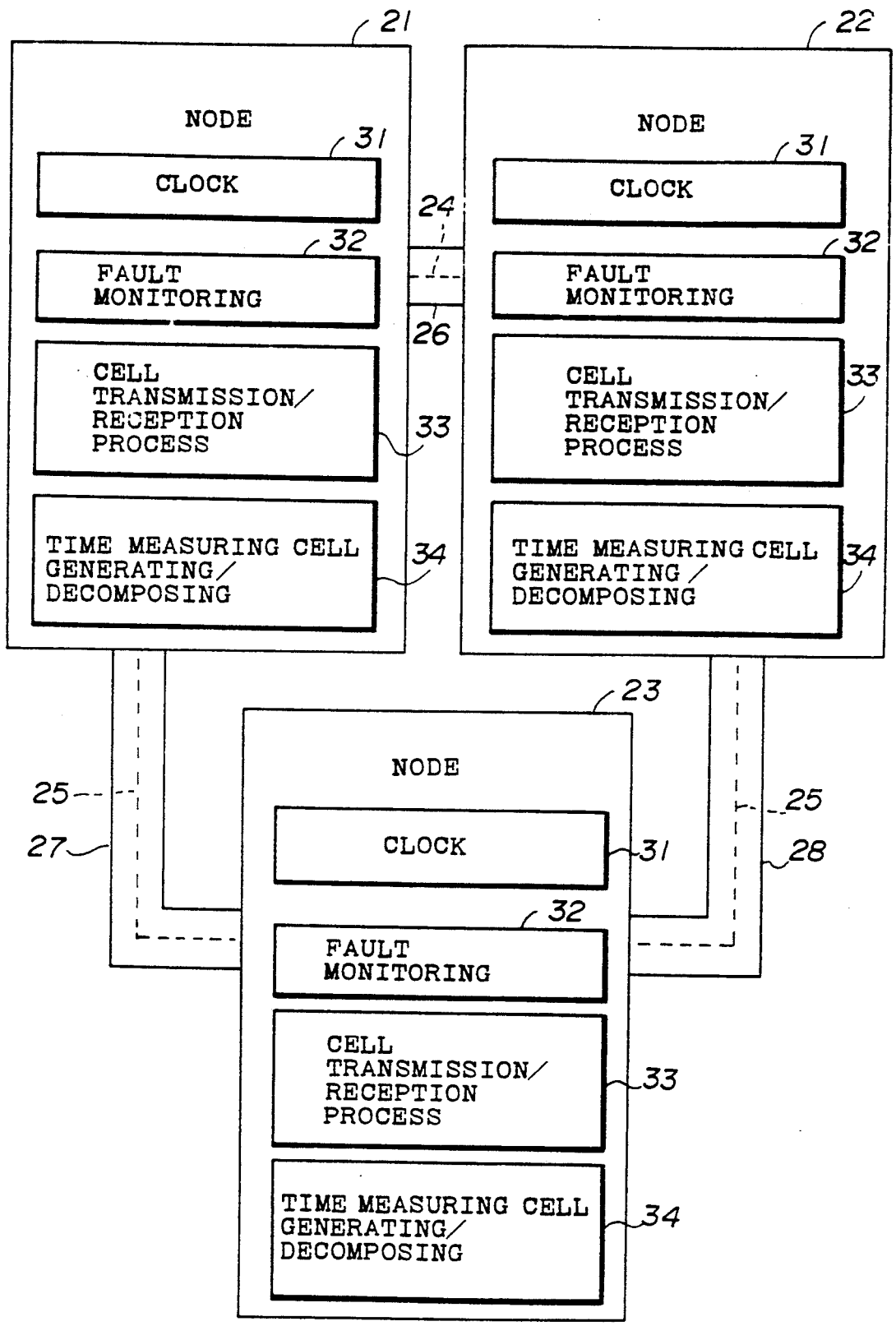
FIG. 7 is a system block diagram showing an embodiment of the change-back system according to the present invention.

Next, a description will be given of an embodiment of the change-back system according to the present invention, by referring to FIG. 7. In FIG. 7, ATM communication nodes 21 and 22 are coupled via a real line 26, ATM communication nodes 21 and 23 are coupled via a real line 27, and ATM communication nodes 22 and 23 are coupled via a real line 28. Between the nodes 21 and 22, a virtual path 24 is allocated as the original path, and a virtual path 25 is allocated as the rerouting path. Each of the nodes 21, 22 and 23 has a clock part 31, a fault monitoring part 32, a cell transmission/reception process part 33, and a time measuring cell generating-/decomposing part 34. A mutual processing is carried out among the nodes 21, 22 and 23.

Figure 8:
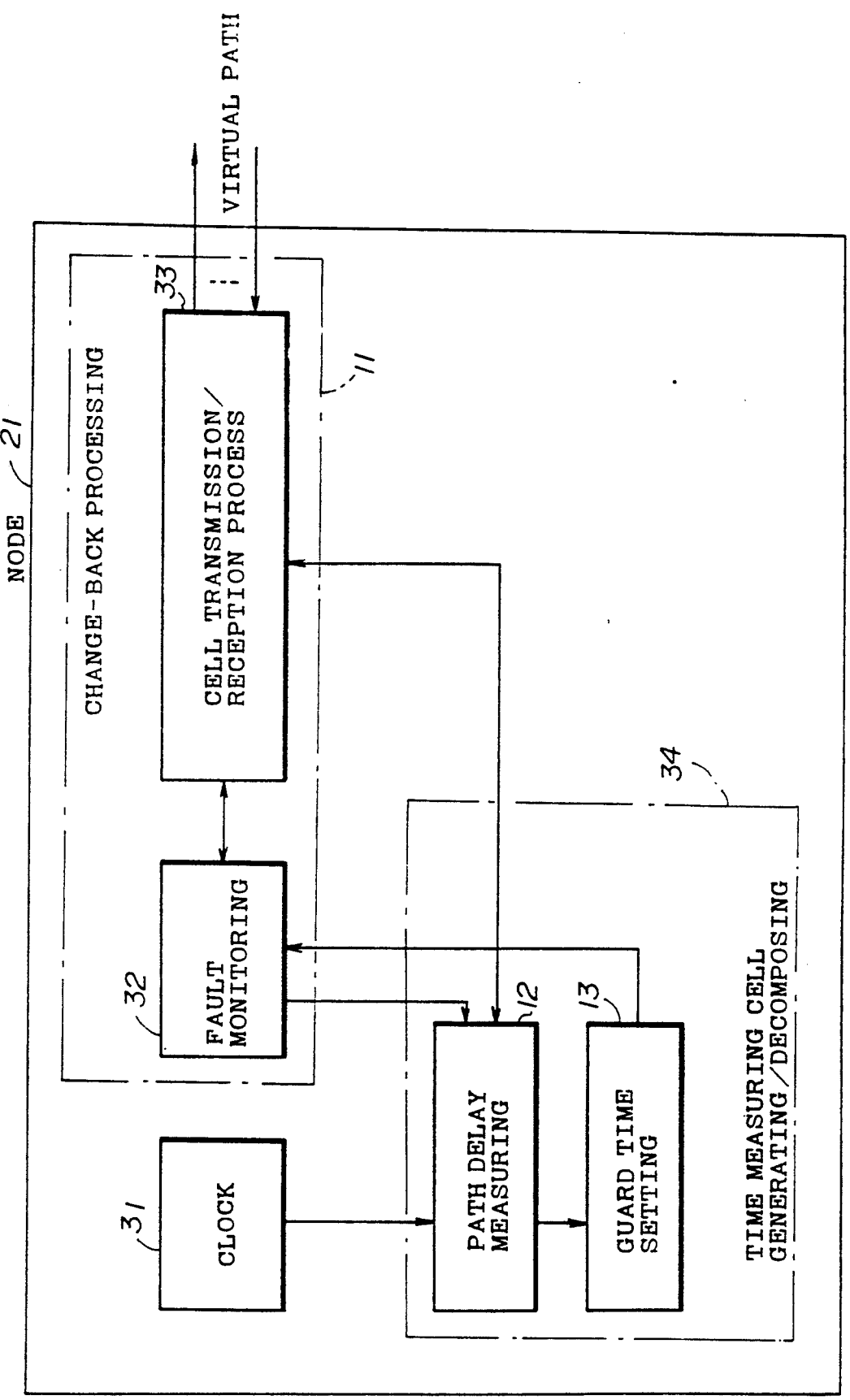
FIG. 8 is a system block diagram showing an embodiment of a node shown in FIG. 7.

FIG. 8 shows the connection of the parts forming each of the nodes 21 through 23 shown in FIG. 7. For the sake of convenience, it will be assumed that FIG. 8 shows the node 21.

In FIG. 8, the clock part 31 stores standard times within the entire ATM network. The fault monitoring part 21 has the function of detecting the generation of a fault in the virtual path which is connected to the node 21, and detecting the fault restoration. The fault monitoring part 21 notifies the path delay measuring part 12 of the virtual path in which the fault is restored.

The path delay measuring part 12 transmits a delay measuring cell to the rerouting path and the original path via the cell transmission/reception process part 33, based on the time which is obtained from the clock part 31. In addition, the path delay measuring part 12 receives each delay measuring cell which is returned via the cell transmission/reception process part 12, and measures an arrival time of the delay measuring cell via the respective paths based on the time which is obtained from the clock part 31. The measured cell arrival times are notified to the guard time setting part 13 which calculates a guard time based on the cell arrival times. The calculated guard time is notified to the fault monitoring part 32.

The fault monitoring part 32 generates a change-back instruction which instructs the change-back process in response to the guard time which is notified from the guard time setting part 13. This change-back instruction is supplied to the cell transmission/reception process part 33 which carries out the change-back process in response to the change-back instruction.

The fault monitoring part 32 and the cell transmission/reception process part 33 forms the change-back processing apparatus 11 shown in FIG. 7. In addition, the path delay measuring part 12 and the guard time setting part 13 form the time measuring cell generating/decomposing part 34.

Figure 9:
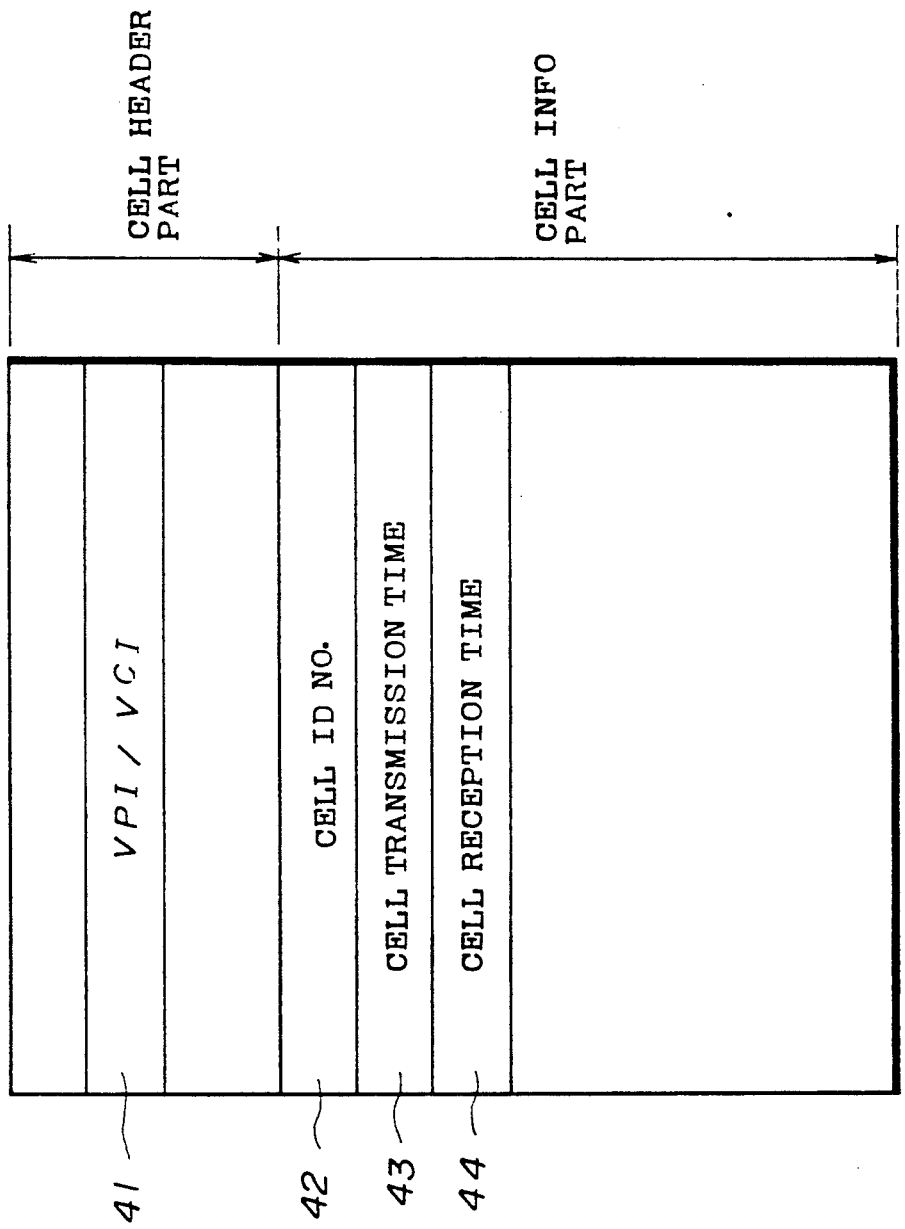
FIG. 9 shows a structure of a delay measuring cell.

FIG. 9 shows the structure or format of the delay measuring cell. As shown, each cell is made up of a cell header part and a cell information part. The cell header part includes a virtual path identifier/virtual channel identifier (VPI/VCI) 41. On the other hand, the cell information part includes a delay measuring cell identification number 42, a cell transmission time 43 and a cell reception time 44.

Next, a description will be given of the operation of this embodiment of the change-back system according to the present invention, by referring to FIGS. 7 through 9.

For the sake of convenience, it will be assumed that a line fault occurs between the nodes 21 and 22 and a rerouting of the virtual path is made, so that the normal cells for transferring information transmitted from the user is made from the node 21 to the node 22 via the virtual path 25 which is used as the rerouting path.

In this case, the fault monitoring part 32 of the node 21 detects the line fault restoration between the nodes 21 and 22 and notifies this to the path delay measuring part 12 of the time measuring cell generating/decomposing part 34. The path delay measuring part 12 generates two delay measuring cells which are respectively transmitted to the virtual paths 24 and 25, and in this state, a transmission time is obtained from the clock part 31 and is written into the cell transmission time 43 of each delay measuring cell shown in FIG. 9. In addition, the path delay measuring part 12 sets the VPI/VCI 41 of each delay measuring cell so that the destination via the virtual path 24 or 25 becomes the node 22. Then, the path delay measuring part 33 requests the transmission of the delay measuring cells to the cell transmission/reception process part 33. Based on the cell header parts of the delay measuring cells, the cell transmission/reception process part 33 transmits the two delay measuring cells to the respective virtual paths 24 and 25.

The cell transmission/reception process part 33 of the node 22 receives the delay measuring cells from the virtual paths 24 and 25. The path delay measuring part 12 of the time measuring cell generating/decomposing part 34 obtains a reception time from the clock part 31 when each delay measuring cell is received, and writes the reception time into the cell reception time 44 of the received delay measuring cell. In addition, the path delay measuring part 12 of the time measuring cell generating/decomposing part 34 sets the VPI/VCI 41 so that each delay measuring cell is transmitted to the node 21 via the same path through which the delay measuring cell was received. Then, the path delay measuring part 12 requests transmission of the delay measuring cell to the cell transmission/reception process part 33. The cell transmission/reception process part 33 transmits the delay measuring cell to the node 21 via the same path through which the delay measuring cell was received, based on the cell header part of the delay measuring cell.

The cell transmission/reception process part 33 of the node 21 supplies the delay measuring cell which is returned from the node 22 to the path delay measuring part 12 of the cell generating/decomposing part 34. The path delay measuring part 12 obtains and records the cell arrival times for the going and returning paths in both the rerouting path and the original path, based on the cell reception time 44 of the delay measuring cell and the time which is obtained from the clock part 31 when the delay measuring cell is received at the node 21.

The rerouting path between the nodes 21 and 22 is used as an original path when viewed from the node 23, and the traffic in this rerouting path differs depending on the time of use. For this reason, the series of operations described above are repeated a number of times so as to obtain the average cell arrival time for each path. The average cell arrival time for each path is supplied to the guard time setting part 31 of the time measuring cell generating/decomposing part 34.

The guard time setting part 13 calculates the guard time according to a predetermined calculation method which is based on the difference between the average arrival times for the original and rerouting paths and takes into consideration past statistics and theoretical values. The calculated guard time is notified to the fault monitoring part 32. The fault monitoring part 32 issues a change-back instruction to the cell transmission/reception process part 33 immediately after receiving the calculated guard time. As a result, the cell transmission/reception process part 33 carries out a change-back process in response to the change-back instruction, but the normal cell is not transmitted to the original path until the guard time elapses from the time when the last normal cell is transmitted to the rerouting path.

Accordingly, the possibility that the first normal cell transmitted via the original path immediately after the change-back arrives at the destination before the arrival of the last normal cell which is transmitted via the rerouting path immediately before the change-back is extremely small by the provision of the guard time. In other words, the order of the normal cells is prevented from being disordered at the destination node 22.

In this embodiment, the node 22 returns the delay measuring cell to the node 21 by writing the cell reception time into the delay measuring cell. However, it is of course possible for the node 21 to measure the cell arrival time by simply receiving the delay measuring cell which is returned from the node 22. In this case, the cell arrival time which can be measured at the node 21 is the average going and returning time.

Next, a description will be given of the detection of the line fault and the detection of the line fault restoration.

When using a leased line, each node transmits a specific code for notifying the fault in the transmission path. In the case of the ATM network, the following measures can be taken. First, the abnormality in the transmission path or the ATM communication node is detected when the synchronization of the cells is lost or when a maintenance cell is received. Second, the restoration of the fault is detected when the cell synchronization is achieved and the maintenance cell is received.

Figure 10:
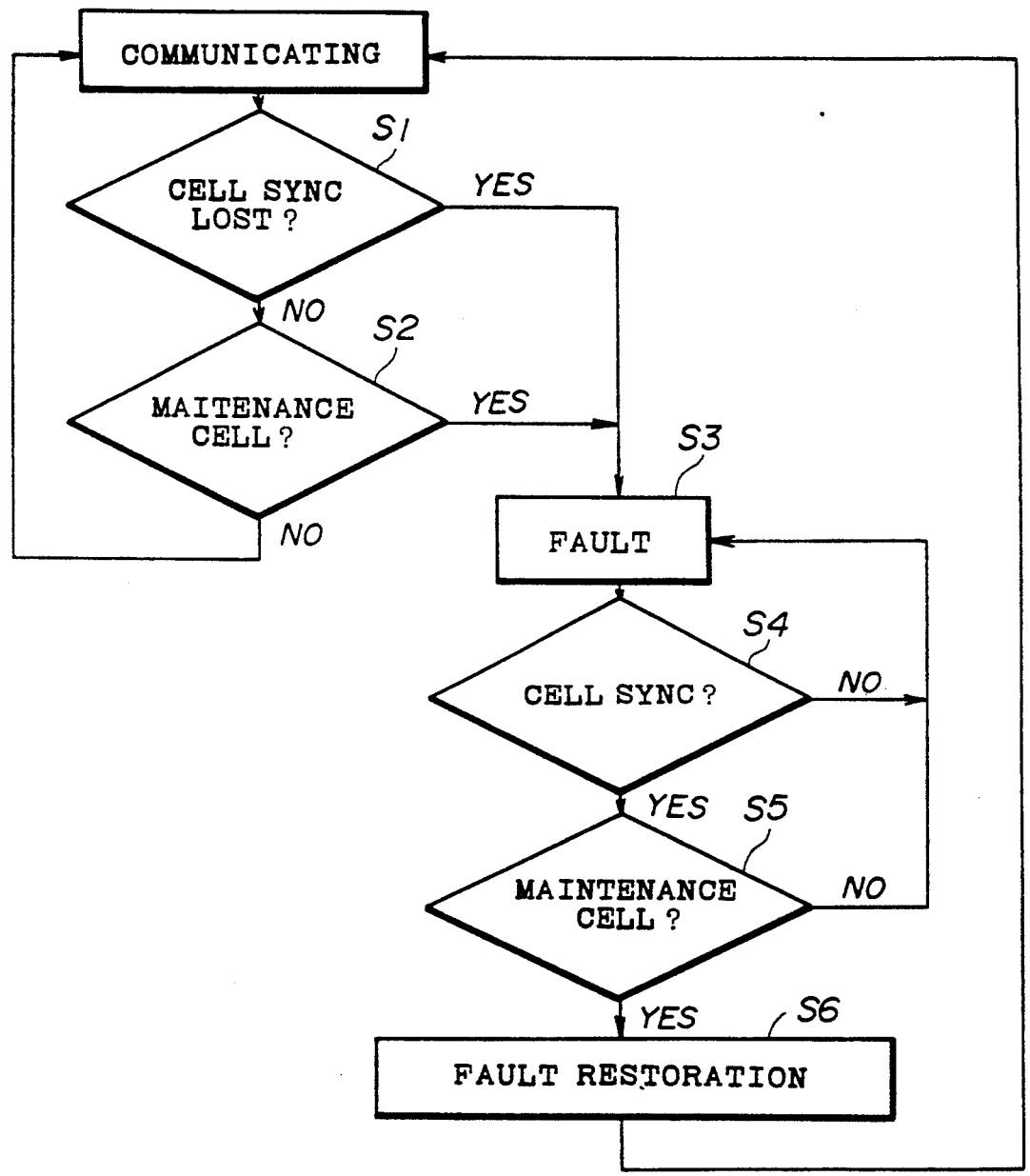
FIG. 10 is a flow chart for explaining a process of detecting a fault and a fault restoration in a fault monitoring part.

FIG. 10 shows a flow chart for explaining the above described detection process of the fault monitoring part 32. In FIG. 10 a step S1 judges whether or not the cell synchronization is lost during a communication. When the judgement result in the step S1 is NO, a step S2 judges whether or not a maintenance cell is received. The process returns to the step S1 when the judgement result in the step S2 is NO. On the other hand, when the judgement result in the step S1 or S2 is YES, a step S3 detects the generation of a fault which may be an abnormality in the ATM communication node or the transmission path.

A step S4 judges whether or not the cell synchronization is achieved after the fault is detected. When the judgement result in the step S4 is YES, a step S5 judges whether or not a maintenance cell is received. The process returns to the step S4 when the judgement result in the step S4 or S5 is NO. On the other hand, when the judgement result in the step S5 is YES, a step S6 detects the fault restoration and the process returns to the step S1.

Figure 11:
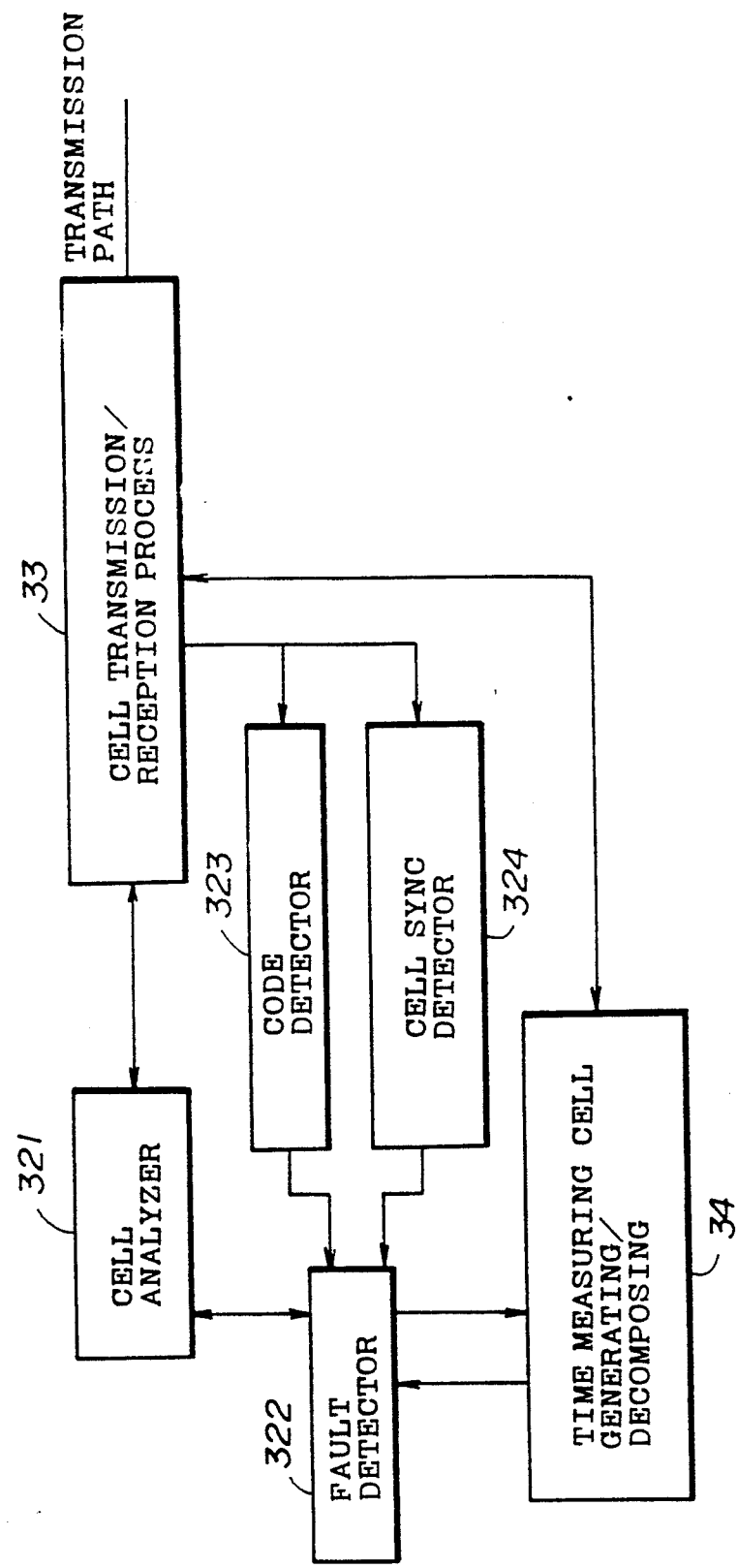
FIG. 11 is a system block diagram showing an essential part of the fault monitoring part.

FIG. 11 shows an essential part of the fault monitoring part 32 for carrying out the process shown in FIG. 10. In FIG. 11, those parts which are the same as those corresponding parts in FIG. 8 are designated by the same reference numerals, and a description thereof will be omitted. The fault monitoring part 32 shown in FIG. 11 includes a cell analyzer 321, a fault detector 322, a coded detector 323 and a cell synchronization detector 324. The cell analyzer 321, the code detector 323 and the cell synchronization detector 324 are coupled to the transmission path via the cell transmission/reception process part 33. The cell analyzer 321 analyzes the cell which is received via the transmission path, and notifies the result of the analysis to the fault detector 322. The code detector 323 detects the code of the cell which is received via the transmission path to detect whether or not the maintenance cell is received. The cell synchronization detector 324 detects whether or not the cells are synchronized. Hence, the fault detector 322 can detect the fault and the fault restoration based on the information received from the cell analyzer 321, the code detector 323 and the cell synchronization detector 324.

Therefore, according to this embodiment of the change-back system, it is possible to prevent the order of the cells from being disordered at the destination node by use of a simple protocol of the ATM communication node. For this reason, it is possible to suppress quality deterioration of the communication without affecting the high-speed information transfer within the ATM network. In addition, it is possible to grasp the state of the ATM network from the measured delay times of each of the paths.

Figure 12:
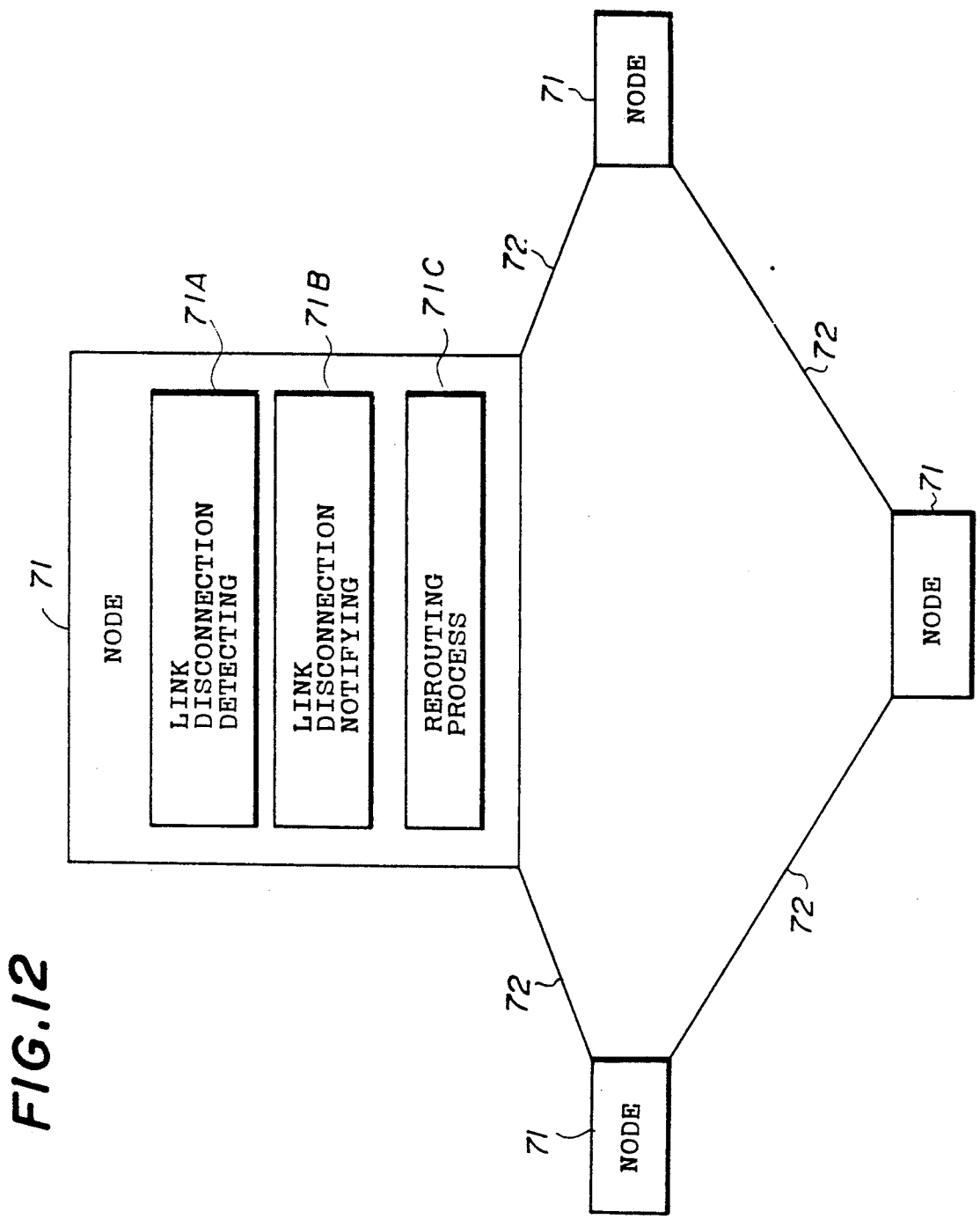
FIG. 12 is a system block diagram for explaining an operating principle of a rerouting system according to the present invention.

Next, a description will be given of an operating principle of a rerouting system according to the present invention, by referring to FIG. 12. In FIG. 12, nodes 71 which operate in the ATM are coupled via links 72 to form a B-ISDN. Each node 71 includes a link disconnection detecting part 71A, a link disconnection notifying part 71B and a rerouting process part 71C.

The link disconnection detecting part 71A detects a cut off of each link 72 which is coupled thereto. When the link disconnection detecting part 71A detects the cut off of the link 72, the link disconnection notifying part 71B notifies the cut off of this link 72 to all nodes 71 which have a possibility of making a call via this cut off link 72. The rerouting process part 71C resets the call which is set via this link 72 to a rerouting path (link) which is determined beforehand when the cut off of this link 72 is notified from the link disconnection notifying part 71B.

The link disconnection detecting part 71A monitors the synchronization of the cells which are received via the link 72, and detects the cut off of this link 72 when the cell synchronization is lost. In addition, the link disconnection notifying part 71B notifies the cut off of the link 72 to each node 71 which has the possibility of making a call via this cut off link 72 by transmitting a predetermined maintenance cell. Accordingly, the cut off of the link 72 is notified directly to each node 71 from the node 71 which detects this cut off. As a result, the rerouting process in each node 71 can be carried out quickly, thereby making it possible to improve the service quality of the B-ISDN.

Figure 13:
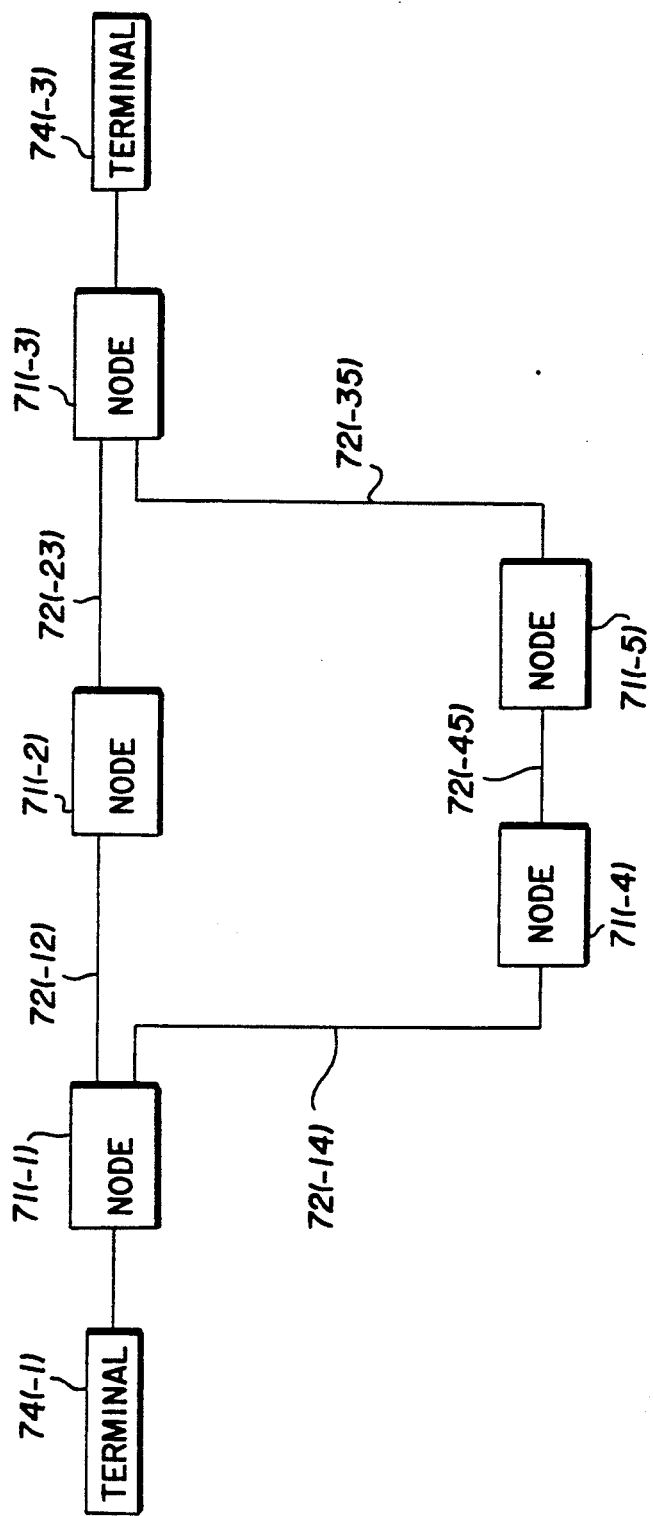
FIG. 13 is a system block diagram showing a B-ISDN to which a first embodiment of the rerouting system according to the present invention may be applied.
Figure 14:
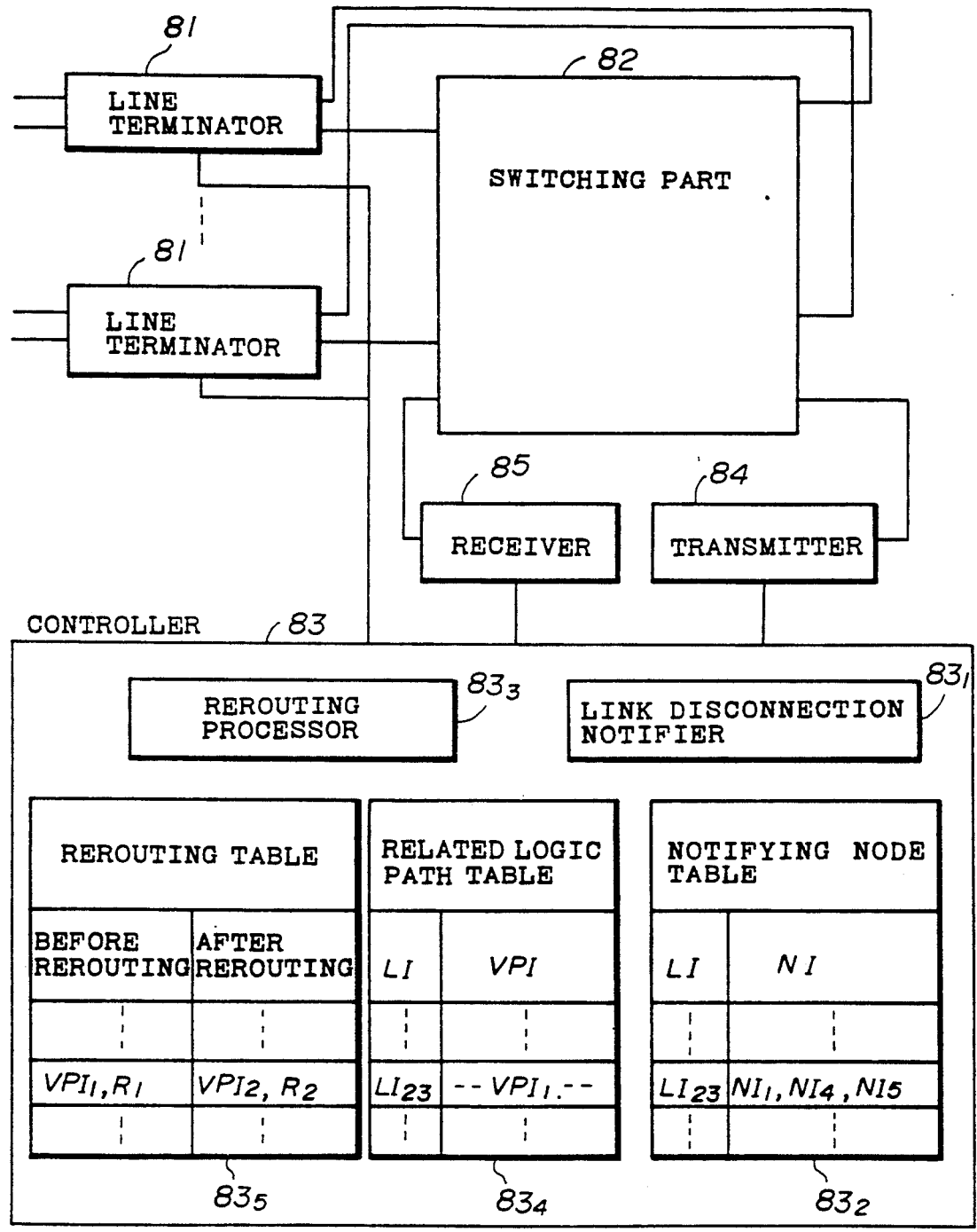
FIG. 14 is a system block diagram showing an embodiment of a node shown in FIG. 13.
Figure 15:
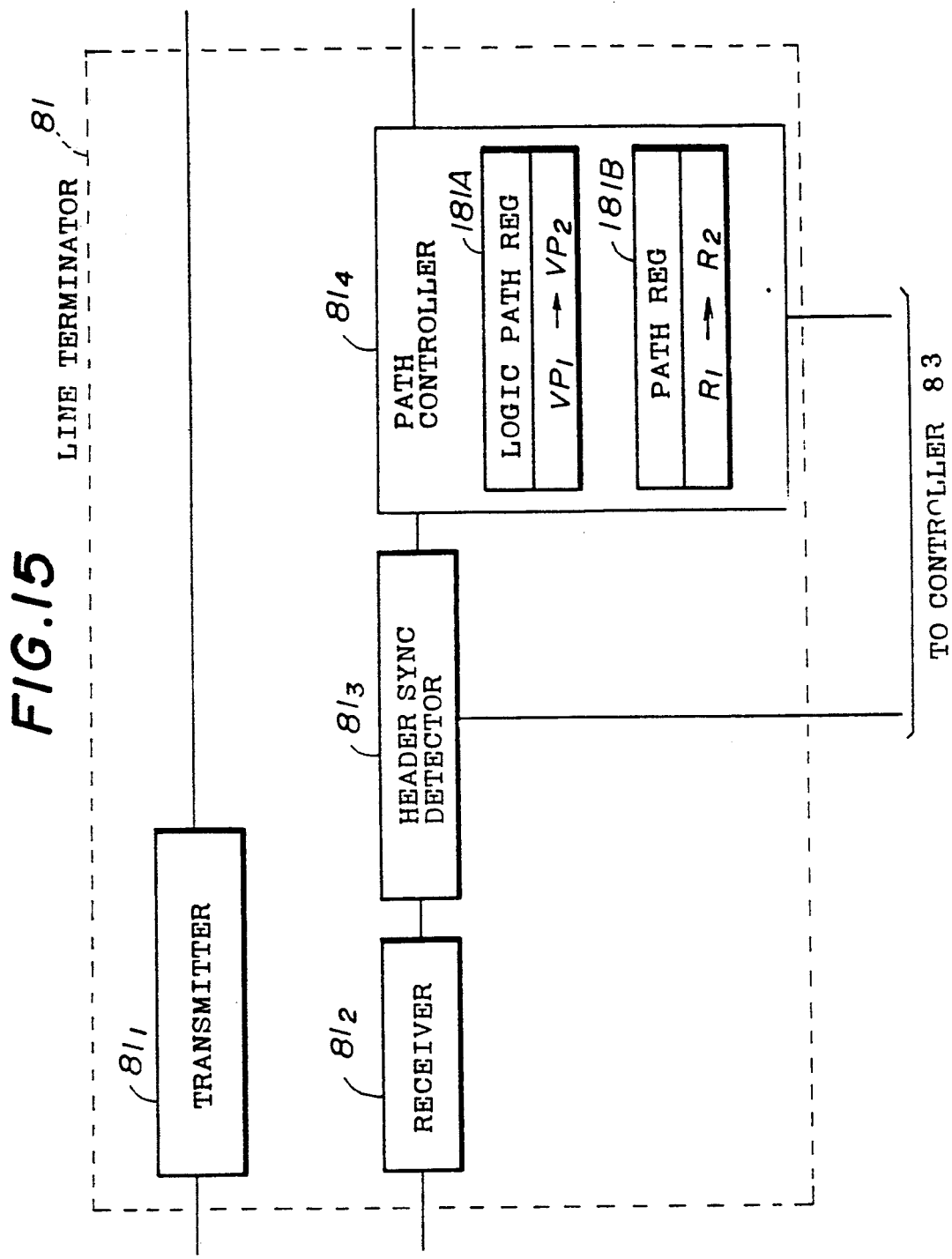
FIG. 15 is a system block diagram showing an embodiment of a line terminator shown in FIG. 13.

Next, a description will be given of a first embodiment of the rerouting system according to the present invention, by referring to FIGS. 13 through 15. FIG. 13 shows a B-ISDN to which this embodiment is applied, and FIG. 14 shows an embodiment of a node which is used in this embodiment of the rerouting system. Furthermore, FIG. 15 shows an embodiment of a line terminator shown in FIG. 14. The same designations are used in FIGS. 13 through 15.

Figure 1:
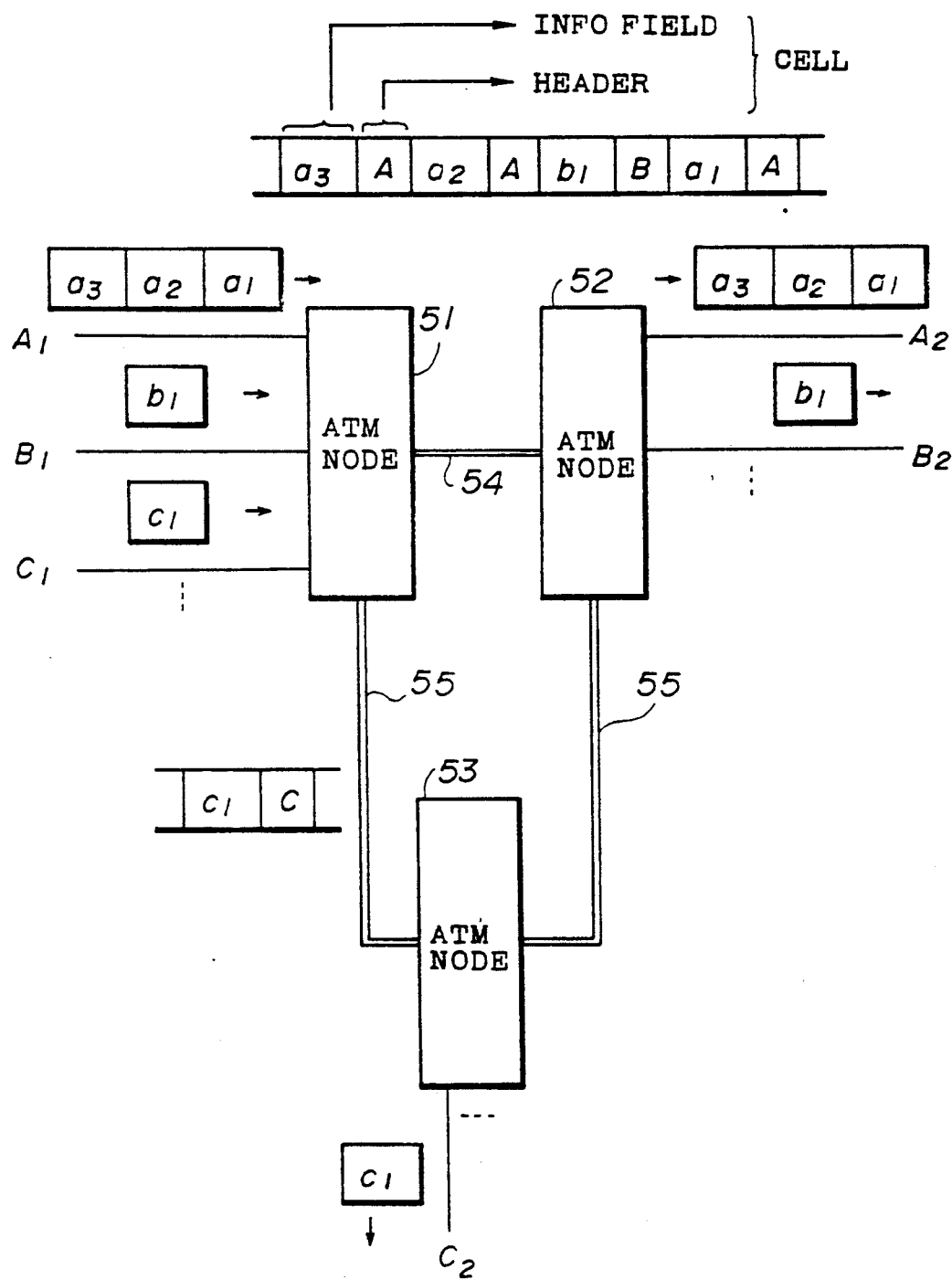
FIG. 1 is a system block diagram showing an example of a conventional ATM network.
Figure 2:
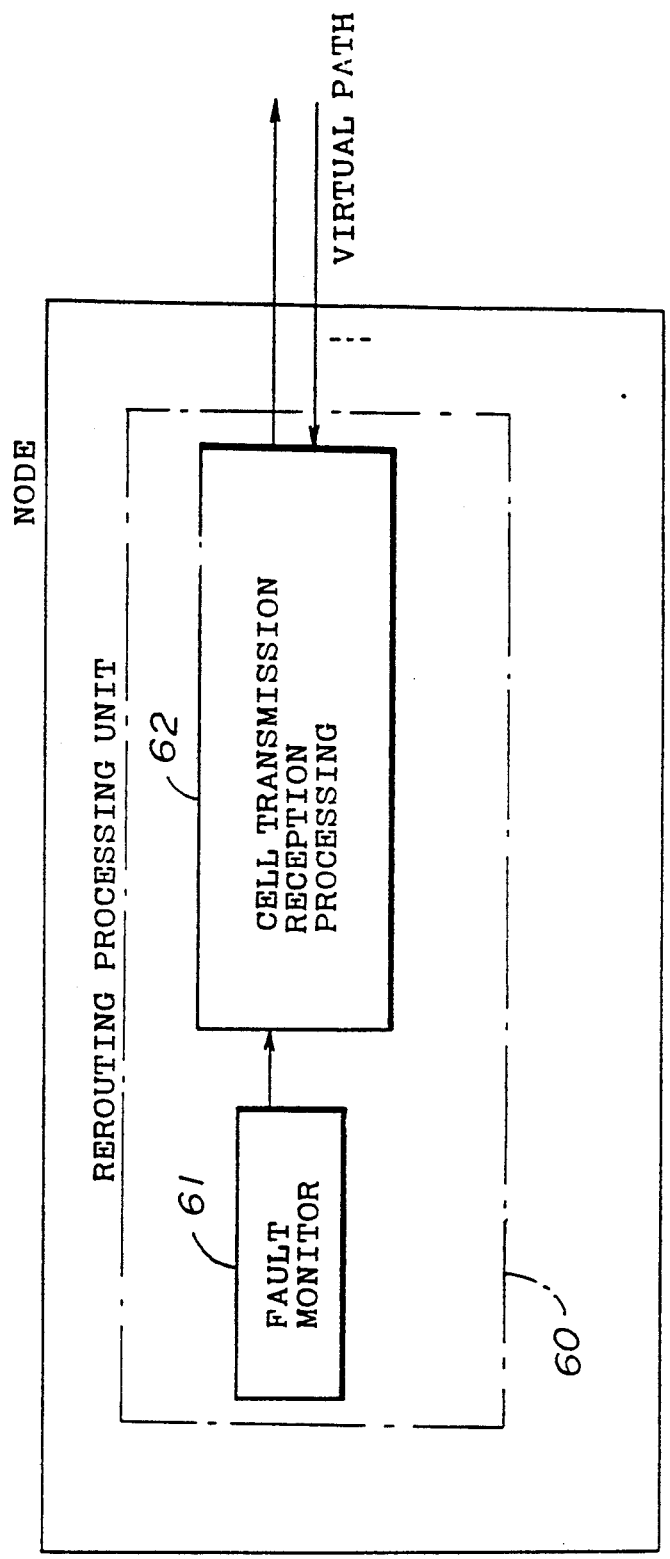
FIG. 2 is a system block diagram showing an example of a conventional rerouting processing unit.
Figure 3:
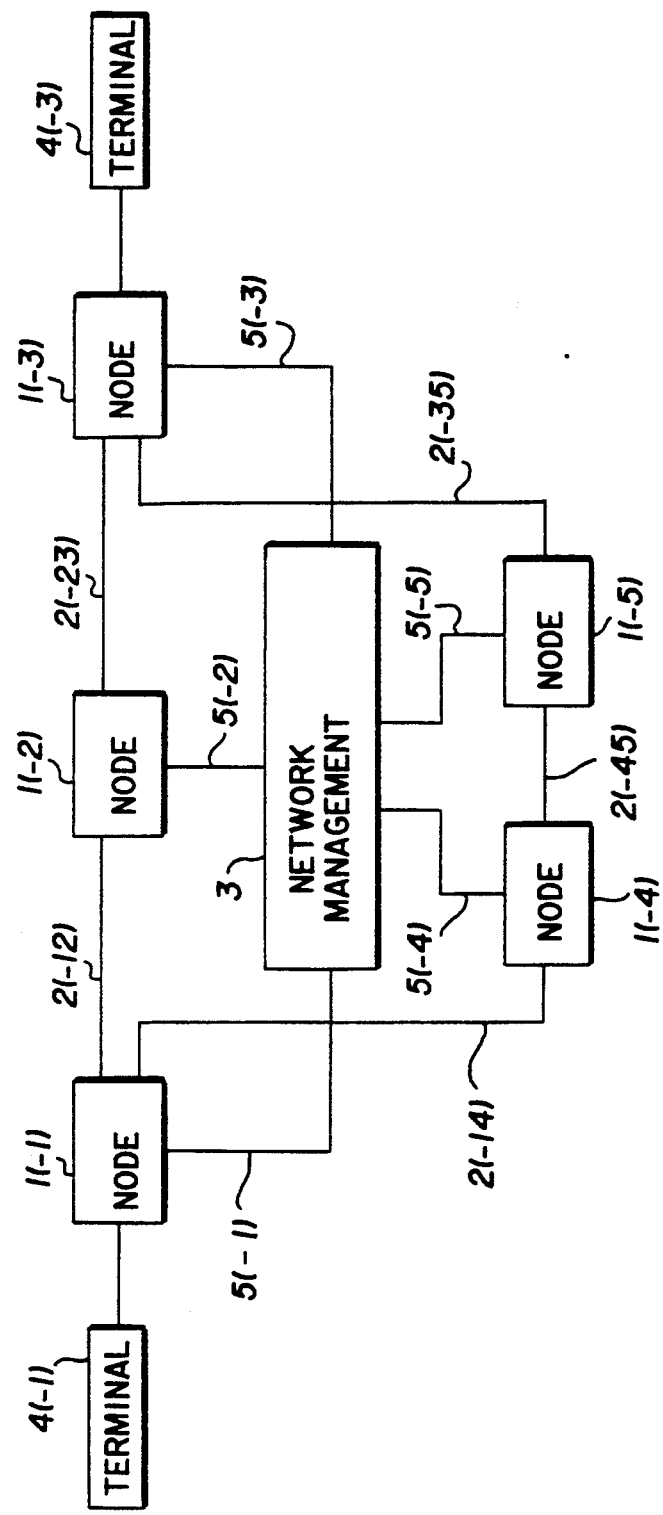
FIG. 3 is a system block diagram showing an example of a conventional broadband ISDN.
Figure 4:
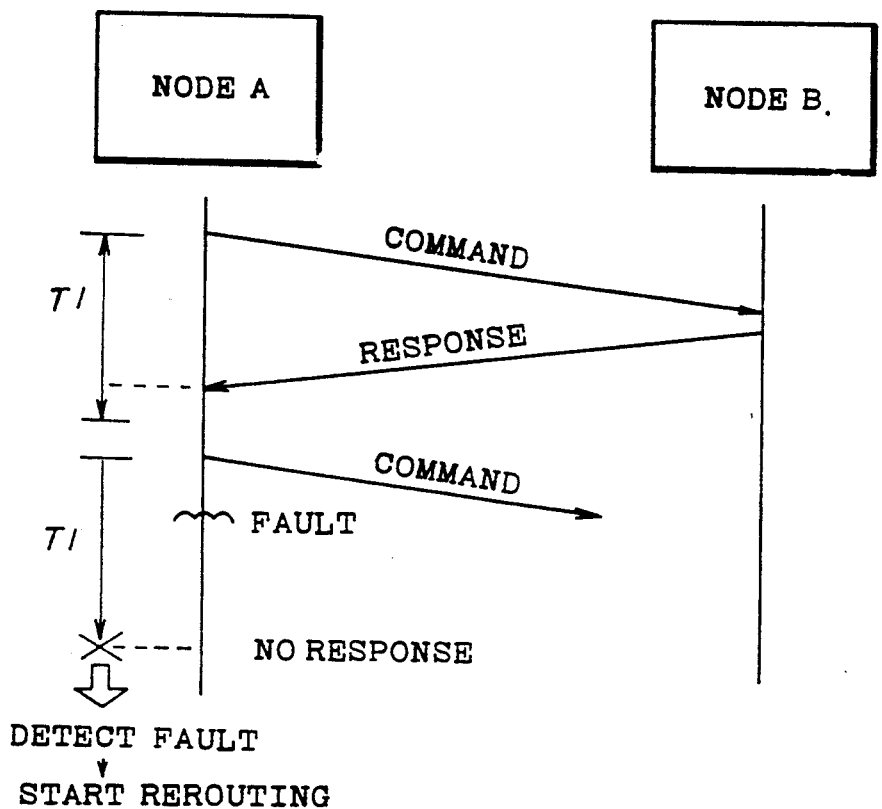
FIG. 4 is a diagram for explaining a method of detecting a fault between two nodes in an example of a conventional STM TDM transmission system.
Figure 5:
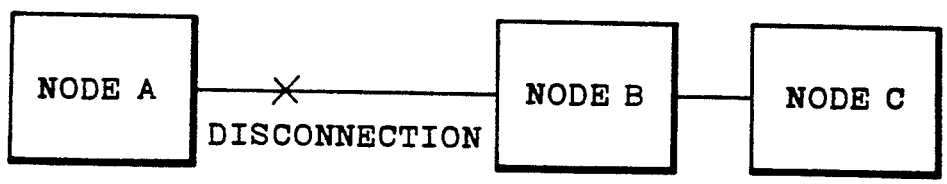
FIG. 5 is a system block diagram for explaining problems of the conventional ATM network.

In FIG. 13, five nodes 71 are coupled via links 72 in the B-ISDN. No network management part is coupled to each node via a communication line as in the case of the conventional system shown in FIG. 3.

In FIGS. 14 and 15, a header synchronization detector 131 is provided within a line terminator 81 to function as the link disconnection detecting part 71A. A link disconnection notifier $83_1$ and a notifying node table $83_2$ are provided within a controller 83 to function as the link disconnection notifying part 71B. A maintenance cell transmitter 84 and a maintenance cell receiver 85 are coupled to a switching part 82 and to the controller 83. In addition, a rerouting processor $83_3$, a related logic path table $83_4$ and a rerouting table $83_5$ are provided within the controller 83 to function as the rerouting process part 71C.

The contents of the notifying node table $83_2$, the related logic path table $83_3$ and the rerouting table $83_5$ do not indicate information related to the same node 71. For example, the notifying node table $83_2$ indicates the contents for the nodes 71-2 and 71-3, and the related logic path table $83_4$ and the rerouting table $83_5$ indicate the contents for the nodes 71-1 and 71-3.

In FIGS. 13 through 15, it will be assumed for the sake of convenience that a terminal 84-1 which is connected to the node 71-1 is coupled to a terminal 84-3 which is connected to the node 71-3, via the node 71-1, the link 72-12, the node 71-2, the link 72-23 and the node 71-3 and that a communication is being made via this logic path VP1.

In the B-ISDN which operates in the ATM, the data transmitted and received between the terminals 84-1 and 84-3 are sectioned into predetermined lengths and transferred in the logic path VP1 in the form of cells which are respectively added with a header which has a predetermined format.

At the node 71-2, a header synchronization detector $81_3$ within the line terminator 81 which is connected to the link 72-23 detects the header of the cell which is received from the link 72-23 via a receiver $81_2$. When the header is detected without error, the header synchronization detector $81_3$ judges that the header at the link 72-23 is synchronized and notifies this to a controller 83. In addition, the header synchronization detector $81_3$ transmits the received cell to a path controller $81_4$.

At the node 71-3, the line terminator 81 which is connected to the link 72-23 carries out a process similar to the above described process.

When the link 72-23 is cut off in this state, the header synchronization detector $81_3$ within the line terminator 81 of each of the nodes 71-2 and 71-3 which are connected to the link 72-23 can no longer detect the header. Hence, the header synchronization detector $81_3$ notifies the controller 83 of the non-synchronized state of the header at the link 72-23.

The controller 83 of each of the nodes 71-2 and 71-3 does not take any measures while being notified from the line terminator 81 that the header is synchronized at the link 72-23. However, when the controller 83 is notified from the line terminator 81 that the header is not synchronized at the link 72-23, the controller 83 starts the link disconnection notifier $83_1$ and notifies the cut off state of the link 72-23. The started link disconnection notifier $83_1$ refers to the notifying node table $83_2$ which is provided within the controller 83.

The notifying node table $83_2$ registers a node identifier NI of all nodes 71 which have the possibility of making a call via each link 72 which is connected to the node 71-2 or 71-3 in correspondence with a link identifier LI which indicates each link 72. For example, as shown in FIG. 14, node identifiers $NI_1$, $NI_4$ and $NI_5$ respectively indicating the nodes 71-1, 71-4 and 71-5 are registered in the notifying node table $83_2$ in correspondence with a link identifier $LI_{23}$ which indicates the link 72-23.

The link disconnection notifier $83_1$ extracts from the notifying node table $83_2$ the node identifiers $NI_1$, $NI_4$ and $NI_5$ which are registered in correspondence with the link identifier $LI_{23}$, and generates a maintenance cell which is used to notify the cut off of the link 72-23 to each of the nodes 71-1, 71-4 and 71-5. The maintenance cells are transmitted from the link disconnection notifier $83_1$ to the maintenance cell transmitter 84.

The maintenance cell transmitter 84 of the node 71-2 transmits each maintenance cell from the controller 83 to a maintenance cell transfer link of the link 72-12 via the switching part 82 and the line terminator 81 which is connected to the maintenance cell transfer link 72-12. The maintenance cell transfer link of the link 72-12 will be simply referred to as the maintenance cell transfer link 72-12, and similar designations will be used hereafter.

The maintenance cell which has the node 71-1 as its destination is transferred to the node 71-1 via the maintenance cell transfer link 72-23. The maintenance cell which has the node 71-4 as its destination is transferred to the node 71-4 via the maintenance cell transfer link 72-12, the node 71-1 and the maintenance cell transfer link 72-14. The maintenance cell which has the node 71-5 as its destination is transferred to the node 71-5 via the maintenance cell transfer link 72-12, the node 71-1, the maintenance cell transfer link 72-14, the node 71-4 and the maintenance cell transfer link 72-45.

The maintenance cell transmitter 84 of the node 71-3 also transfer the maintenance cells to the respective destination nodes 71-5, 71-4 and 71-1 by a process similar to the above described process.

At the node 71-1, the maintenance cell from the node 71-2 arrives via the maintenance cell transfer link 72-12 and the maintenance cell from the node 71-3 arrives via the maintenance cell transfer link 72-14. The received maintenance cells are transmitted to the maintenance cell receiver 85 via the line terminator 81 which is connected to the maintenance cell transfer links 72-12 and 72-14, and the switching part 82. The maintenance cell receiver 85 transmits each received maintenance cell to the controller 83. The controller 83 which receives the maintenance cells starts the rerouting processor $83_3$ and transmits the received maintenance cells.

The started rerouting processor $83_3$ analyzes the received maintenance cells, and refers to the related logic path table $83_4$ when the cut off of the link 72-23 is detected.

The related logic path table $83_4$ registers a logic path identifier VPI in correspondence with the link identifier LI which indicates each link 72, where the logic path identifier VPI indicates all logic paths which may be set via each link 72 for the node 71-1 to which the related logic path table $83_4$ belongs. For example, a logic path identifier $VPI_1$ which indicates the logic path VPI from the node 71-1 to the node 71-3 via the link 72-12, the node 71-2 and the link 72-23 is registered in correspondence with the link identifier $LI_{23}$ which indicates the link 72-23 as shown in FIG. 14, together with other logic path identifiers VPI.

After extracting from the notifying node table $83_2$ the logic path identifier $VPI_1$ which is registered in correspondence with the link identifier $LI_{23}$, the rerouting processor $83_3$ then refers to the rerouting table $83_5$. The rerouting table $83_5$ registers a logic path identifier VPI which indicates a logic path (after rerouting) to be used in place of a logic path (before rerouting) in which the call is placed and the cut off occurs and related path information R. The above logic path identifier VPI which indicates the logic path before the rerouting and the related path information R are registered in correspondence with the logic path identifier VPI which indicates the logic path before the rerouting and the related path information R. For example, with respect to the logic path identifier $VPI_1$ which indicates the logic path VPI before the rerouting and related path information $R_1$, the rerouting table $83_5$ registers a logic path identifier $VPI_2$ which indicates a logic path VP2 and related path information $R_2$. The logic path VP2 extends from the node 71-1 to the node 71-3 via the link 72-14, the node 71-4, the link 72-45, the node 71-5 and the link 72-53.

When the rerouting processor $83_3$ extracts from the rerouting table $83_5$ the logic path identifier $VPI_2$ and the related path information $R_2$ which are registered in correspondence with the logic path identifier $VPI_1$ and the related path information $R_1$, the rerouting processor $83_3$ successively makes a reference to the path controller $81_4$ within each line terminator 81.

In the line terminator 81, a logic path identifier VPI which indicates a logic path which is being set via this line terminator 81 is set in a logic path register 181A. In addition, path information R which is to be added to the header of a cell which is transferred via the above path which is being set is set in a path register 181B.

For example, when the rerouting processor $83_3$ detects that the logic path identifier $VPI_1$ before the rerouting is set in the logic path register 181A within the line terminator 81 which is connected to the terminal 74-1 out of the line terminators 81 to which the reference is successively made, the rerouting processor $83_3$ renews the content of the logic path register 181A to the logic path identifier $VPI_2$ after the rerouting extracted from the rerouting table $83_5$.

In addition, the rerouting processor $83_3$ renews the path information $R_1$ before the rerouting set in the path register 181B to the path information $R_2$ after the rerouting extracted from the rerouting table $83_5$.

Thereafter, the cells which are transmitted from the terminal 74-1 and intended for the destination terminal 74-3 are transferred to the node 71-3 via the logic path VP2, based on the logic path identifier $VPI_2$ and the path information $R_2$ which are set in the respective registers 181A and 181B within the path controller $81_4$.

The cells transferred to the node 71-3 are transmitted to the destination terminal 74-3.

At the nodes 71-2 and 71-3 which detect the cut off of the link 72-23, the started link disconnection notifier $83_1$ transmits the maintenance cell to each node 71 which is registered in the notifying node table $83_2$ by carrying out the process described above. In addition, the rerouting processor $83_3$ is also started. When the cut off of the link 72-23 is notified to the rerouting processor $83_3$, the rerouting processor $83_3$ carries out a process similar to that described above so as to renew the logic path identifier VPI and the related path information R before the rerouting which are set within the line terminator 81 by the logic path identifier VPI and the related path information R after the rerouting. For example, at the node 71-3, the logic path identifier $VPI_1$ and the related path information $R_1$ before the rerouting which are set in the path controller $81_4$ within the line terminator 81 which is connected to the terminal 74-3 are renewed by the logic path identifier $VPI_2$ and the related path information $R_2$ after the rerouting.

Accordingly, even at the node 71-3, the cells which are transmitted from the terminal 74-3 and intended for the terminal 74-1 are transferred to the node 71-1 via the logic path VP2 and is transmitted to the terminal 74-1.

At the nodes 71-1 and 71-3, the rerouting process is carried out similarly for the paths other than the logic path VPI by renewing the logic path before the rerouting by the logic path after the rerouting. In addition, the rerouting process is similarly carried out for each logic path at the nodes 71-2, 71-4 and 71-5.

Therefore, according to this embodiment of the rerouting system, it is possible to quickly carry out the rerouting process for the call which is set.

The link disconnection detecting part 71A in the described embodiment detects the cut off of the link 2 by detecting the header synchronization in the header synchronization detector $81_3$ within the line terminator 81. However, the cut off of the link 2 may be detected by other methods, and the superior effects of this embodiment is unaffected by the method used to detect the cut off of the link 2. Of course, the structures of the B-ISDN and the nodes are not limited to those of this embodiment.

Figure 16:
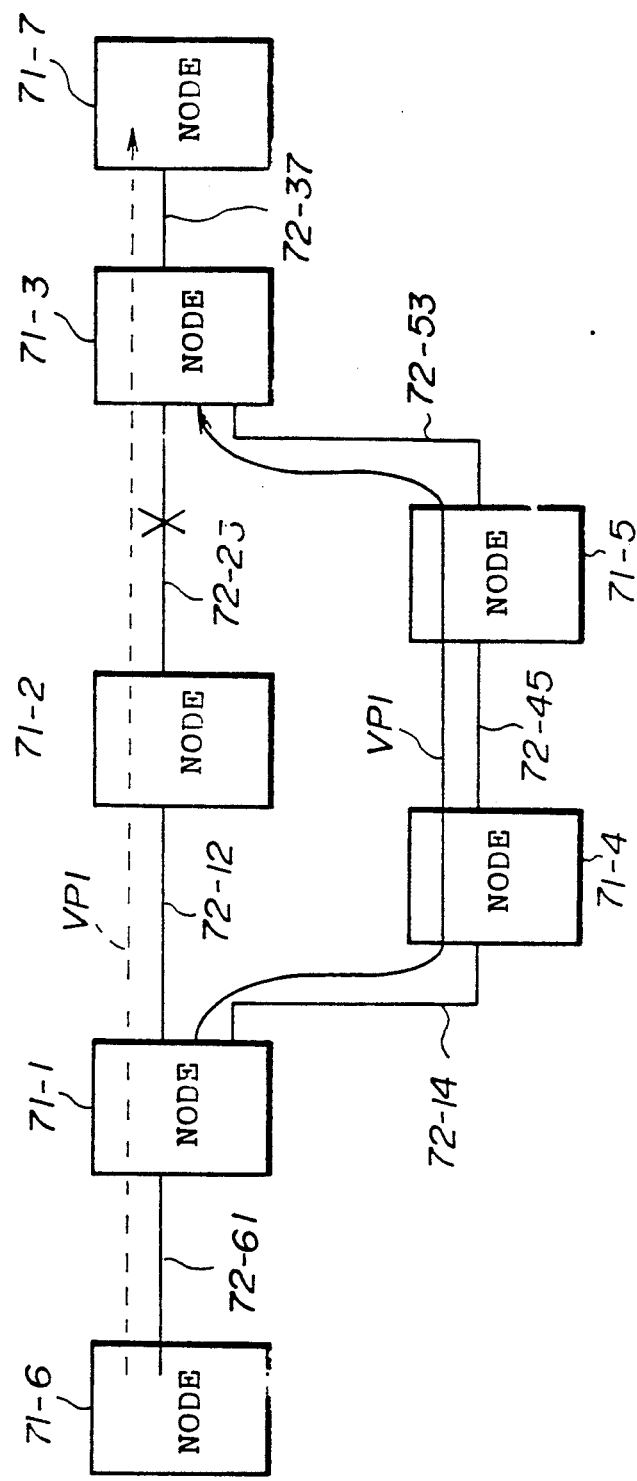
FIG. 16 is a system block diagram showing a B-ISDN to which a second embodiment of the rerouting system according to the present invention may be applied.

Next, a description will be given of a second embodiment of the rerouting system according to the present invention. FIG. 16 shows a B-ISDN which is formed by a plurality of nodes 71-1 through 71-6 which are coupled via links 72. It is assumed for the sake of convenience that a disconnection occurs in the link 72-23 between the nodes 71-2 and 72-3.

In this embodiment, the disconnection of the link 72-23 is detected by use of header error control (HEC) which is an operation result of a cyclic redundancy check (CRC) of four bytes of the header of the ATM cell. The operation result HEC is inserted into the fifth byte of the header on the cell transmitting side. Hence, at the receiving side, the operation result HEC of the CRC of the four bytes of the header should match the HEC which is inserted into the fifth byte of the header unless a bit error exists. On the other hand, the bit error does not occur frequently. Hence, the disconnection of the link can be detected if the operation result HEC at the receiving side does not match the HEC in the fifth byte of the header for N consecutive times.

Figure 17:
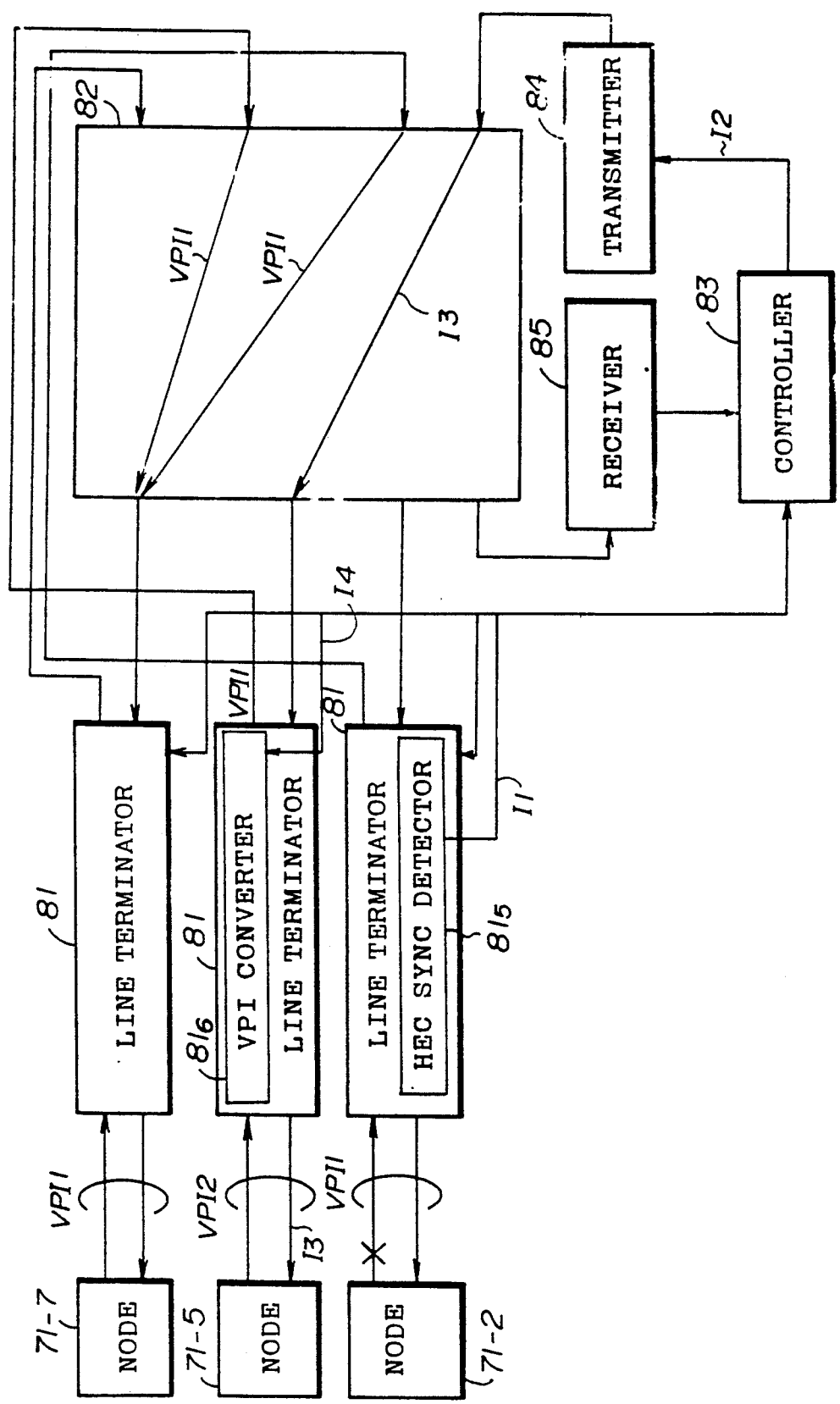
FIG. 17 is a system block diagram for explaining an operation of one node within the B-ISDN shown in FIG. 16.
Figure 18:
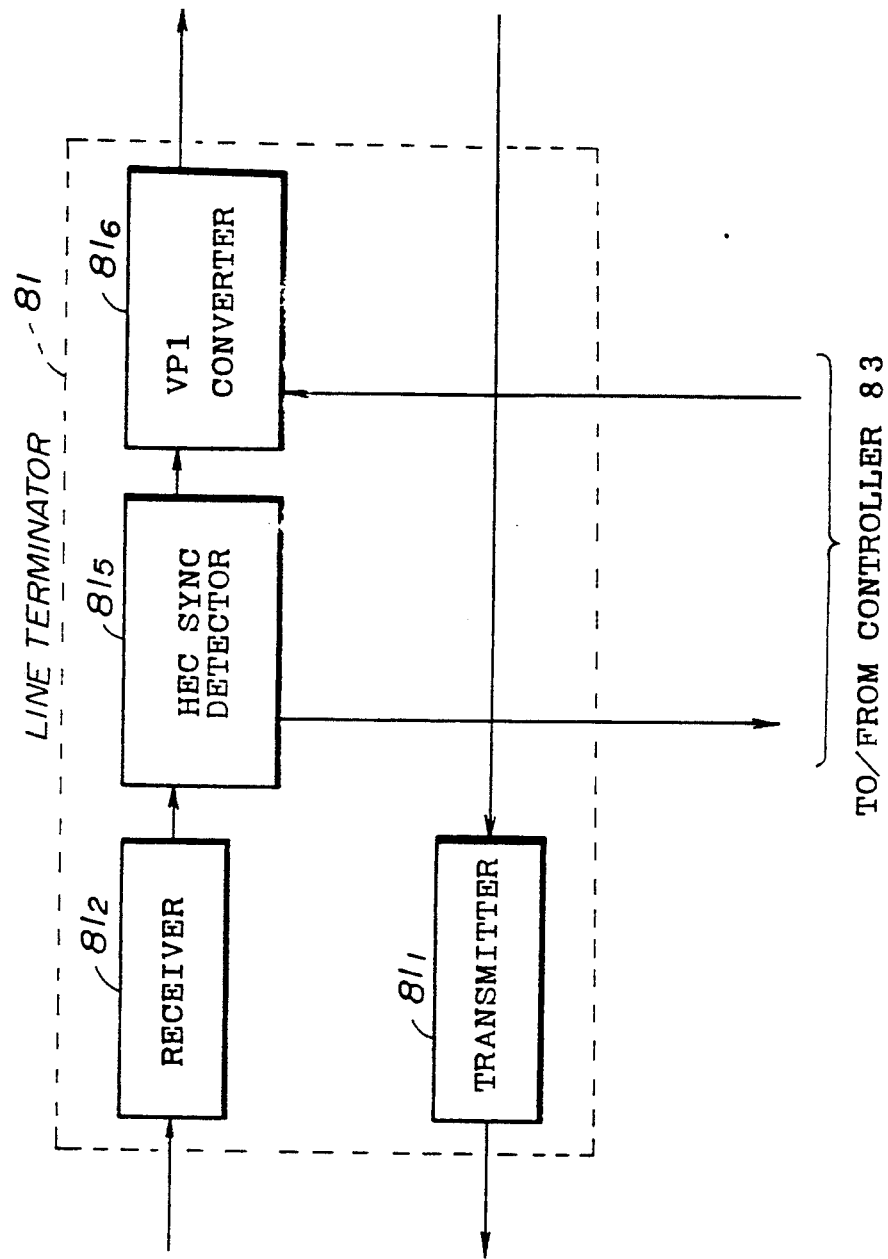
FIG. 18 is a system block diagram showing an embodiment of a line terminator shown in FIG. 17.

FIG. 17 shows an embodiment of the node 71 for explaining the operation of the node 71-3 shown in FIG. 16, and FIG. 18 shows an embodiment of a line terminator 81 of the node 71-3 shown in FIG. 17. In FIGS. 17 and 18, those parts which are the same as those corresponding parts in FIGS. 14 and 15 are designated by the same reference numerals, and a description thereof will be omitted. The line terminator 81 shown in FIG. 18 includes a transmitter $81_1$, a receiver $81_2$, a HEC synchronization detector $81_5$ and a switching information adder and VPI converter $81_6$.

When the link 72-23 between the nodes 71-2 and 71-3 is disconnected, the HEC synchronous detector $81_5$ within the line terminator 81 of the node 71-3 shown in FIG. 17 detects the disconnection of a receiving path $VPI_1$ and notifies this disconnection to the controller 83 as indicated by an arrow I1. The controller 83 reads the rerouting path $VPI_2$ from the rerouting table $83_5$ within the controller 83 in response to the disconnection notification from the HEC synchronous detector $81_5$. The controller 83 notifies the disconnected original path $VPI_1$ and the rerouting path $VPI_2$ to the maintenance cell transmitter 84 as indicated by an arrow I2, and the maintenance cell transmitter 84 transmits a maintenance cell which includes the path information to the rerouting path $VPI_2$ as indicated by an arrow I3. In addition, the controller 83 instructs the VPI converter $81_6$ within the line terminator 81 to convert the VPI of the cell which is thereafter received with the rerouting path $VPI_2$ into the path $VPI_1$ as indicated by an arrow I4.

Figure 19:
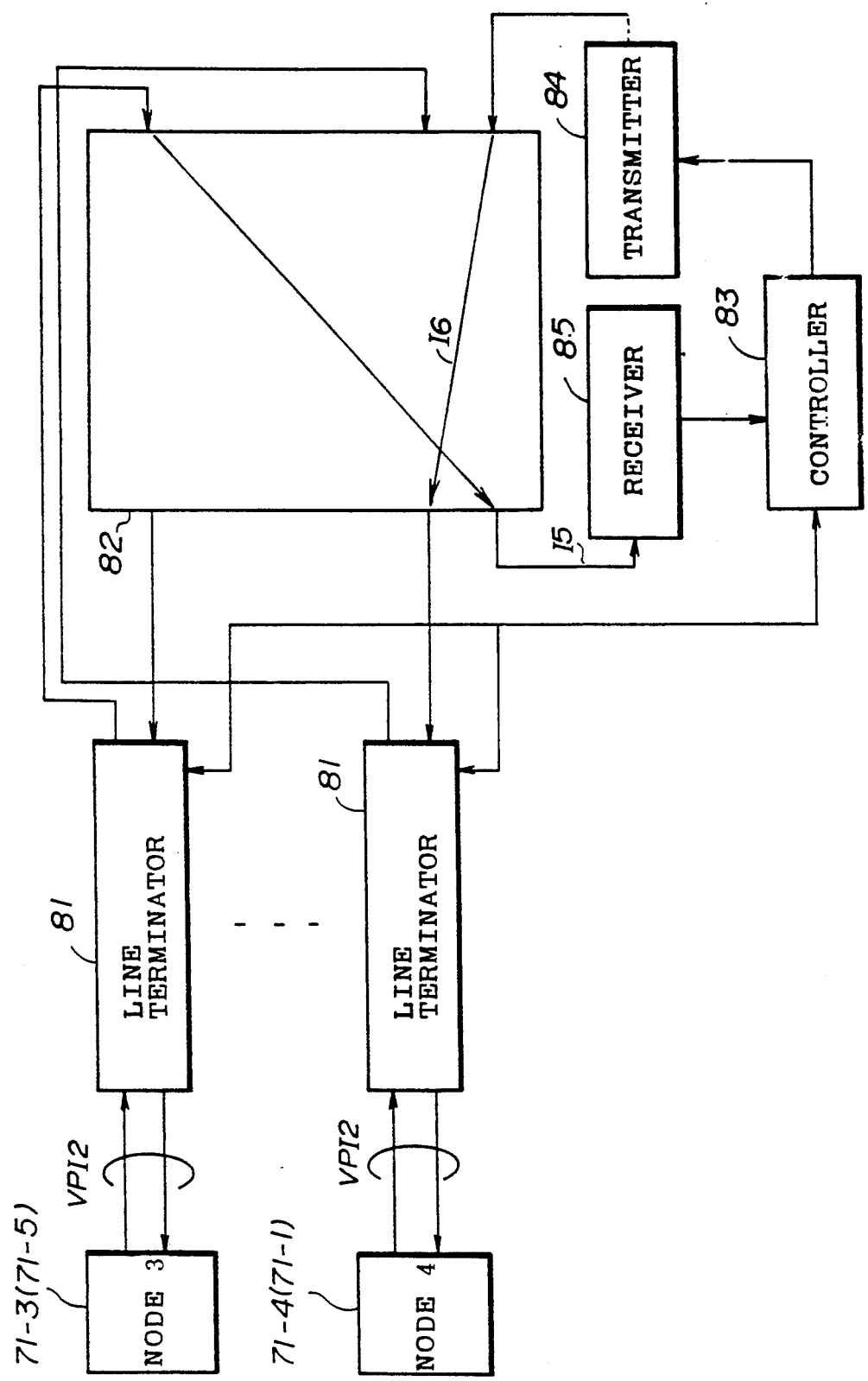
FIG. 19 is a system block diagram for explaining an operation of two nodes within the B-ISDN shown in FIG. 16.

FIG. 19 is a system block diagram for explaining operations of the nodes 71-4 and 71-5 shown in FIG. 16. In FIG.19, those parts which are the same as those corresponding parts in FIG. 17 are designated by the same reference numerals, and a description thereof will be omitted. For the sake of convenience, the reference numerals are shown in FIG. 19 for the node 71-4, but the reference numerals shown in brackets in indicate the reference numerals for the case where the block system operates as the node 71-5.

When the node 71-4 (or 71-5) receives the maintenance cell which is transmitted from the maintenance cell transmitter 84 of the node 71-3 described above as indicated by an arrow I5, the controller 83 of the node 71-4 (or 71-5) reads the disconnected path $VPI_1$ and the rerouting path $VPI_2$ included in the path information part of the maintenance cell. In this case, the controller 83 judges that the node 71-4 (or 71-5) is not a branching point of the two paths $VPI_1$ and $VPI_2$. Hence, the node 71-4 (or 71-5) transmits the received maintenance cell to the next node 71-5 (or 71-3) as it is as indicated by an arrow I6.

Figure 20:
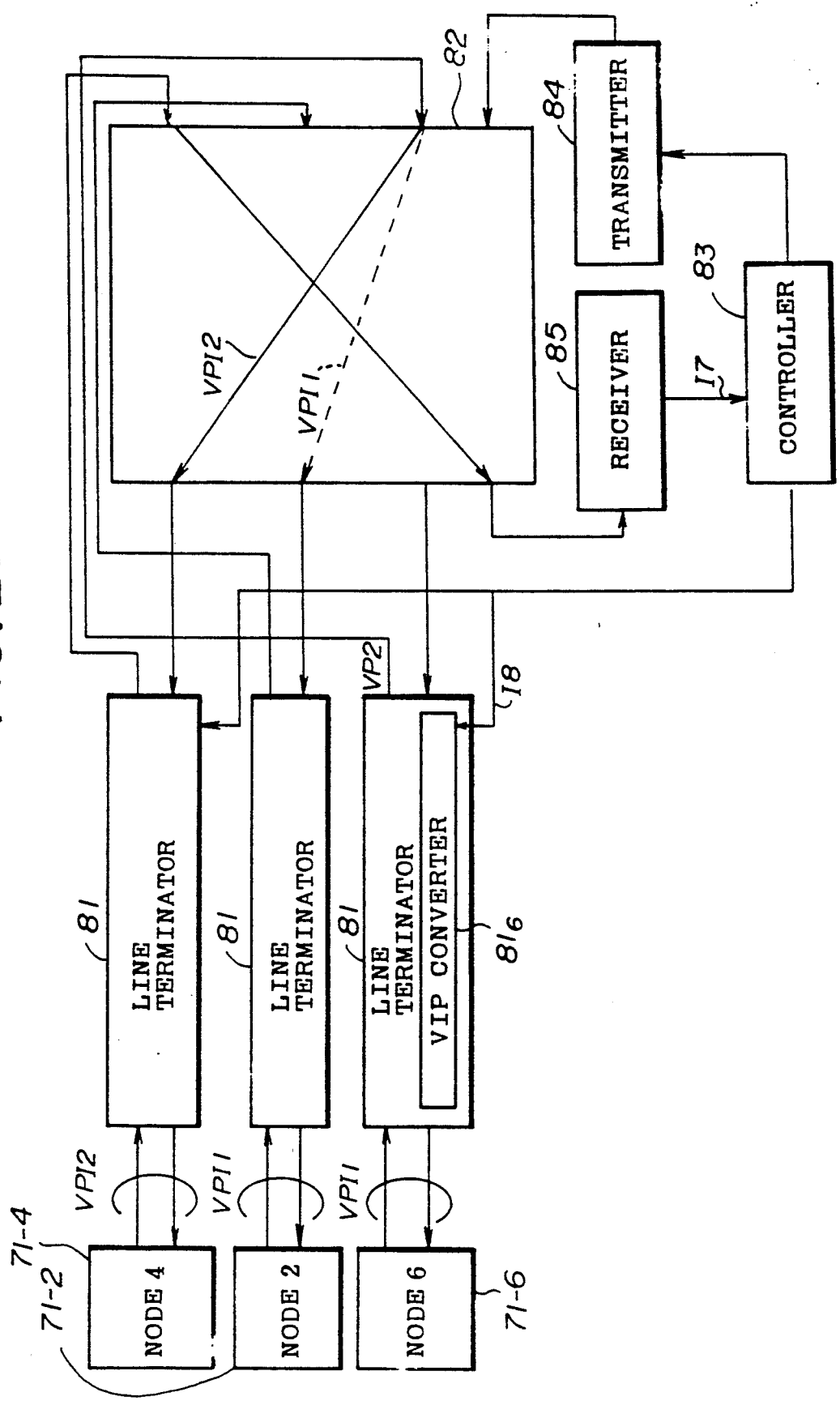
FIG. 20 is a system block diagram for explaining an operation of another node within the B-ISDN shown in FIG. 16.

FIG. 20 is a system block diagram for explaining an operation of the node 71-1 shown in FIG. 16. In FIG. 20, those parts which are the same as those corresponding parts in FIG. 17 are designated by the same reference numerals, and a description thereof will be omitted.

When the node 71-1 receives the maintenance cell which is transmitted from the maintenance cell transmitter 84 of the node 71-3 described above as indicated by an arrow I7, the controller 83 of the node 71-1 reads the disconnected path $VPI_1$ and the rerouting path $VPI_2$ included in the path information part of the maintenance cell. In this case, the controller 83 judges that the node 71-1 is a branching point of the two paths $VPI_1$ and $VPI_2$. Hence, the controller 83 instructs the VPI converter $81_6$ within the line terminator 81 to convert the path $VPI_1$ into the path $VPI_2$ as indicated by an arrow I8. Thereafter, when the node 71-1 receives a cell having a VPI value which indicates the path $VPI_1$, the VPI converter $81_6$ converts the VPI value into a value corresponding to the path $VPI_2$ so as to carry out the rerouting.

Figure 21:
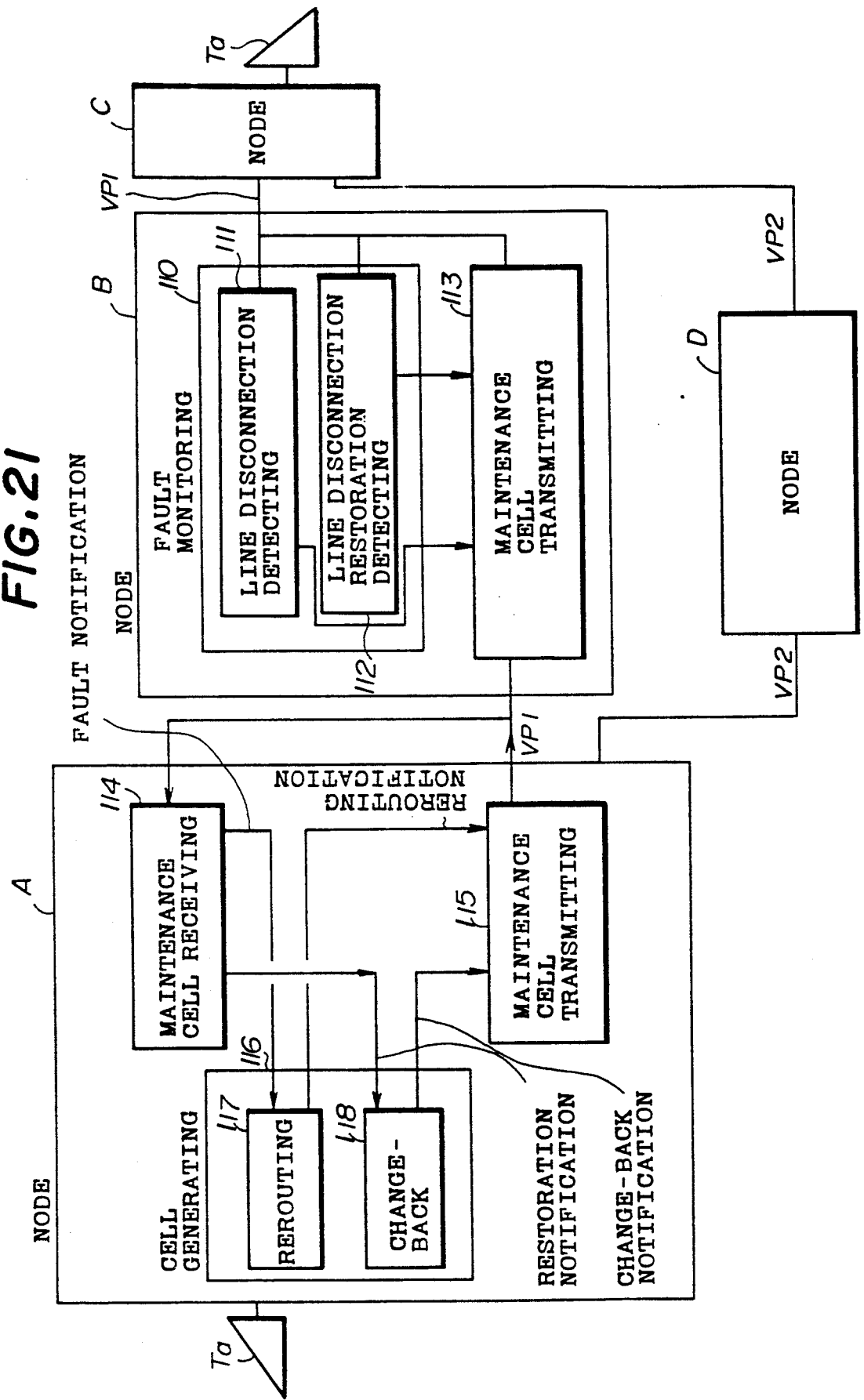
FIG. 21 is a system block diagram for explaining an operating principle of a rerouting/change-back system according to the present invention.

Next, a description will be given of an operating principle of a rerouting/change-back system according to the present invention, by referring to FIG. 21. In FIG. 21, nodes A through D are coupled via lines, and a terminal Ta is connected to the node A and a terminal Tc is connected to the node C. A communication is made between the terminals Ta and Tc, and the nodes B and D are used as relay nodes.

The nodes B and D respectively include a line monitoring part 110 and a maintenance cell transmitting part 13. The line monitoring part 110 is provided in correspondence with each line, and includes a line disconnection detecting part 111 and a line disconnection restoration detecting part 112. On the other hand, the nodes A and C respectively include a maintenance cell receiving part 114, a maintenance cell transmitting part 115 and a cell generating part 116. The cell generating part 116 includes a rerouting part 117 and a change-back part 118.

In this rerouting/change-back system, the maintenance cell is used to notify the line disconnection to the end node when the line disconnection is detected. The node which receives this notification makes a rerouting, and uses the maintenance cell to notify the other nodes of this rerouting. In addition, when the line disconnection restoration is detected by the node, the maintenance cell is used to notify the end node of this line disconnection restoration. The end node which receives this notification notifies the other node of a change-back and makes the change-back with respect to the end node itself.

In FIG. 21, the terminal Ta which is connected to the node A and the terminal Tc which is connected to the node C communicate via a virtual circuit VC which is included in a virtual path VP1. When the virtual path VP1 cannot be used prior to the communication, a virtual path VP2 is set as the rerouting path.

The rerouting process is carried out as follows.

First, when the virtual path VP1 between the nodes B and C cannot be used due to a line fault, this line fault is detected by the line disconnection detecting part 111 of the fault monitoring part 110 in each of the nodes B and C. The line disconnection detecting part 111 detects the line fault by detecting the non-synchronous state (cell sync-out) of the HEC. The synchronization of the HEC is equivalent to the synchronization of the ATM cells.

Second, at each of the nodes B and C, the maintenance cell transmitting part 113 transmits a maintenance cell which notifies the line fault, that is, the non-synchronous state of the HEC, to the going and returning directions of the related virtual path VP. In this case, the maintenance cell is transmitted only to the virtual path VP1. The maintenance cell is a control cell for notifying the state of the virtual path to not only the relay nodes but also to the end node.

Third, when the node A which terminates the virtual path VP1 receives the maintenance cell at the maintenance cell receiving part 114, the receipt of the maintenance cell is notified to the rerouting part 117 within the cell generating part 116. The node C operates similarly because the node C also terminates the virtual path VP1.

Fourth, when the rerouting part 117 is notified from the maintenance cell receiving part 114 that the maintenance cell is received, the rerouting part 117 switches the path from the virtual path VP1 which is used up to that point in time to a virtual path VP2 which is preset as the rerouting path. This switching of the path is called rerouting, and the rerouting is carried out by changing the content of the virtual path identifier which is added to the header of the cell. In other words, the virtual path identifier is changed from a value indicating the virtual path VP1 to a value indicating the virtual path VP2.

Fifth, when the rerouting is made by the rerouting part 117 of each of the nodes A and C, the maintenance cell transmitting part 115 is started to transmit the maintenance cell which indicates that the rerouting has been made. This maintenance cell is transmitted from the node A to the node C and vice versa.

Sixth, the rerouting is completed when the node A receives the maintenance cell which indicates that the rerouting has been made from the node C and vice versa.

The change-back is carried out as follows. For the sake of convenience, it will be assumed that the terminals Ta and Tc communicate via the virtual path VP2 which is used as the rerouting path.

First, when the line fault between the nodes B and C is restored and the virtual path VP1 becomes usable, the restored synchronization is detected by the line disconnection restoration detecting part 112 within the fault monitoring part 110 of each of the nodes B and C.

Second, at each of the nodes B and C, the maintenance cell transmitting part 113 transmits a maintenance cell for notifying the restored synchronization to the going and returning directions of the related virtual path VP1.

Third, when the node A which terminates the virtual path VP1 receives the maintenance cell at the maintenance cell receiving part 114, the receipt of the maintenance cell is notified to the change-back part 118 within the cell generating part 116. The change-back part 118 carries out a control to switch back the path from the rerouting virtual path VP2 to the original virtual path VP1. In addition, the change-back part 118 instructs the maintenance cell transmitting part 115 to transmit a maintenance cell for notifying the change-back to the node C. The node C operates similarly because the node C also terminates the virtual path VP1.

Fourth, when the node C receives the maintenance cell which indicates that the change-back has been made, it is confirmed that the node A has made the change-back and the change-back is completed. The node A operates similarly to the node C.

During the second step of each of the rerouting and change-back operations described above, the maintenance cell is transmitted in both the going and returning directions of the path because the fault may be generated in only one direction of the line.

Figure 22:
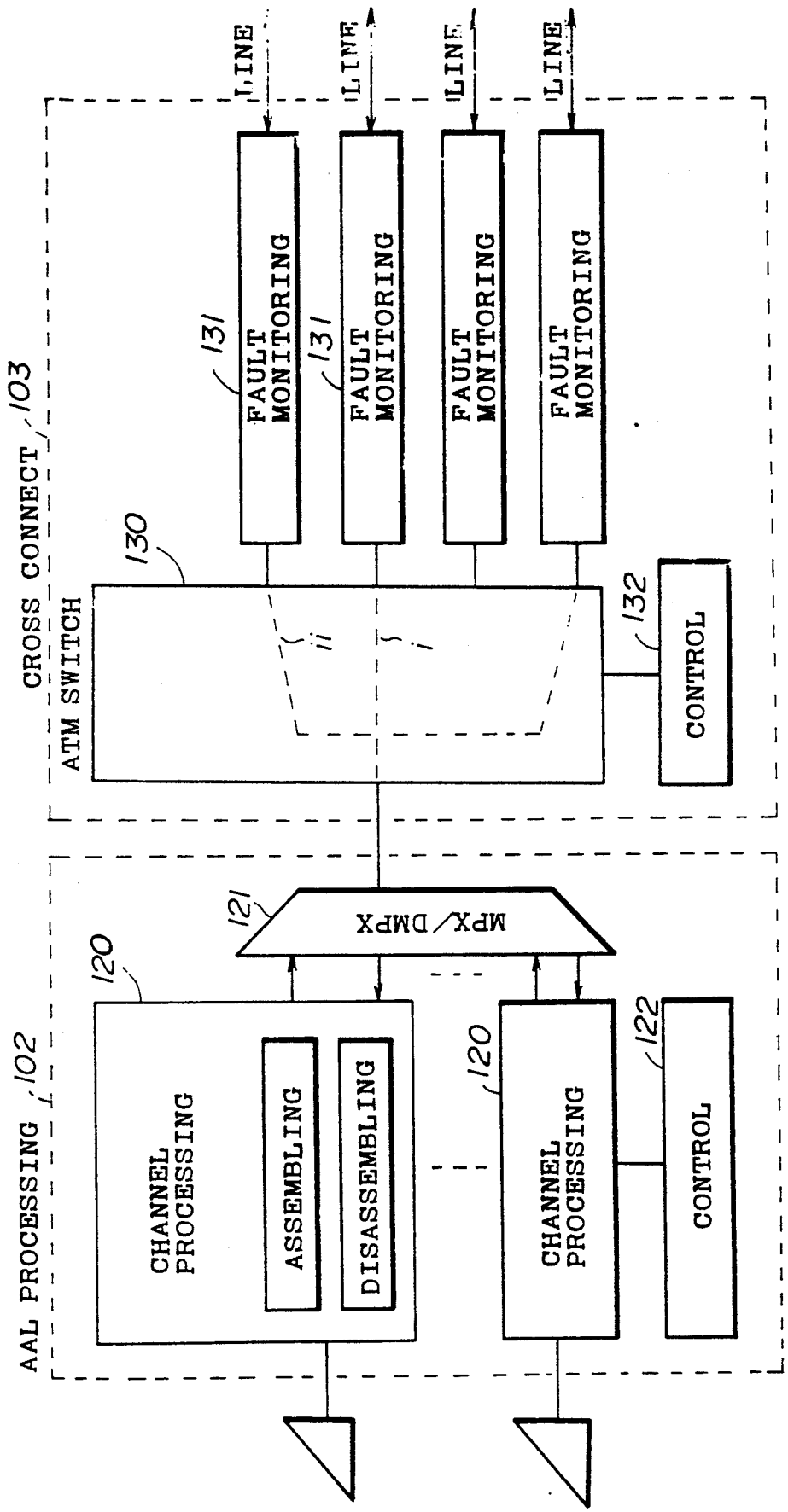
FIG. 22 is a system block diagram showing an embodiment of a node in an embodiment of the rerouting/change-back system according to the present invention.
Figure 23:
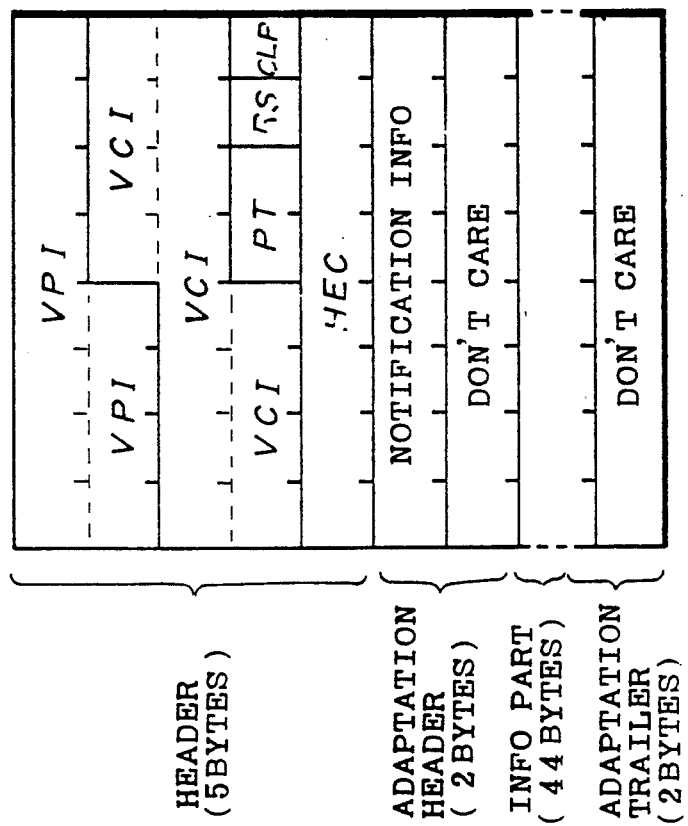
FIG. 23 shows a structure of an ATM cell.
Figure 24:
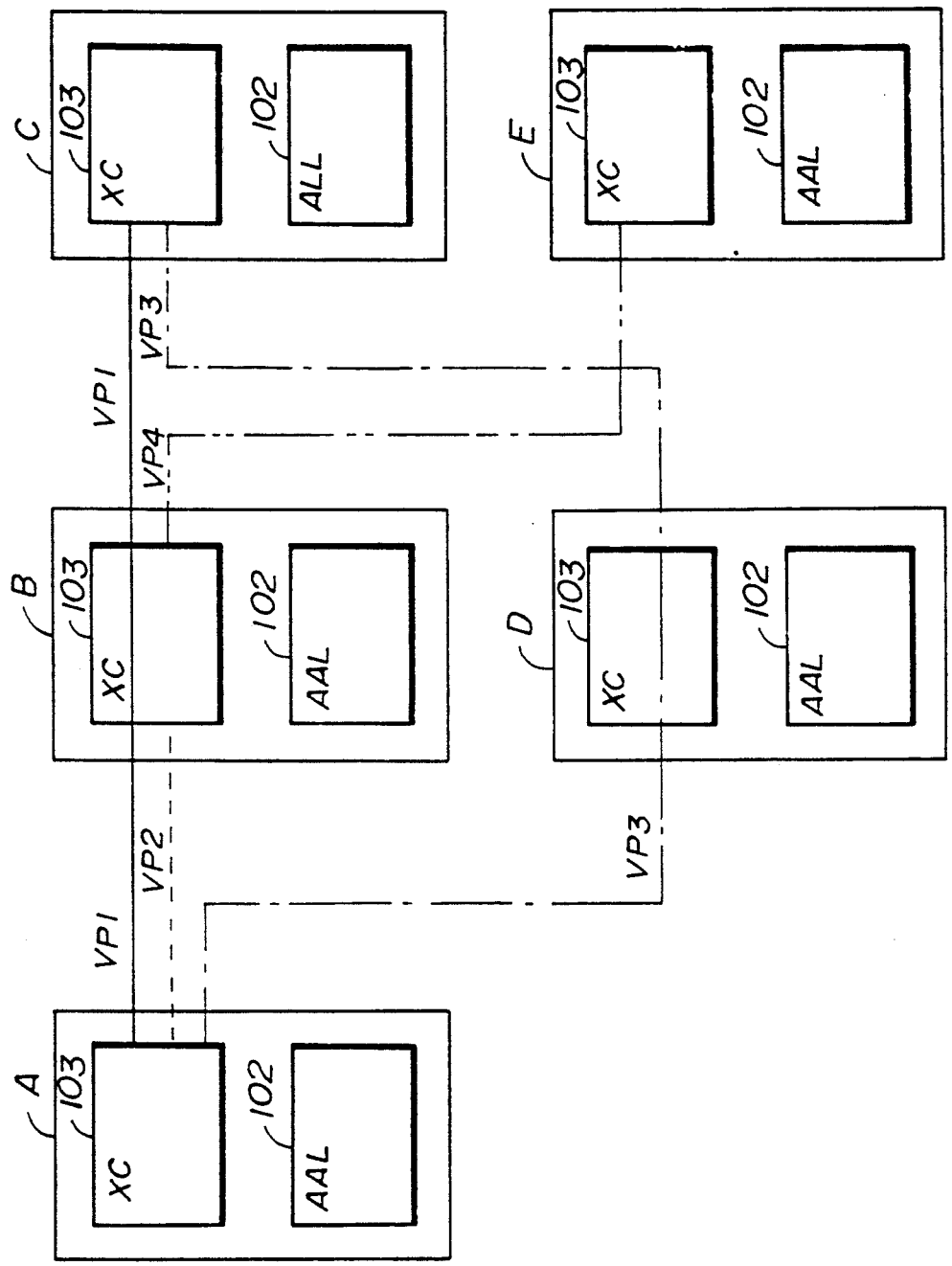
FIG. 24 is a system block diagram showing an ATM network to which this embodiment of the rerouting/change-back system may be applied.
Figure 25:
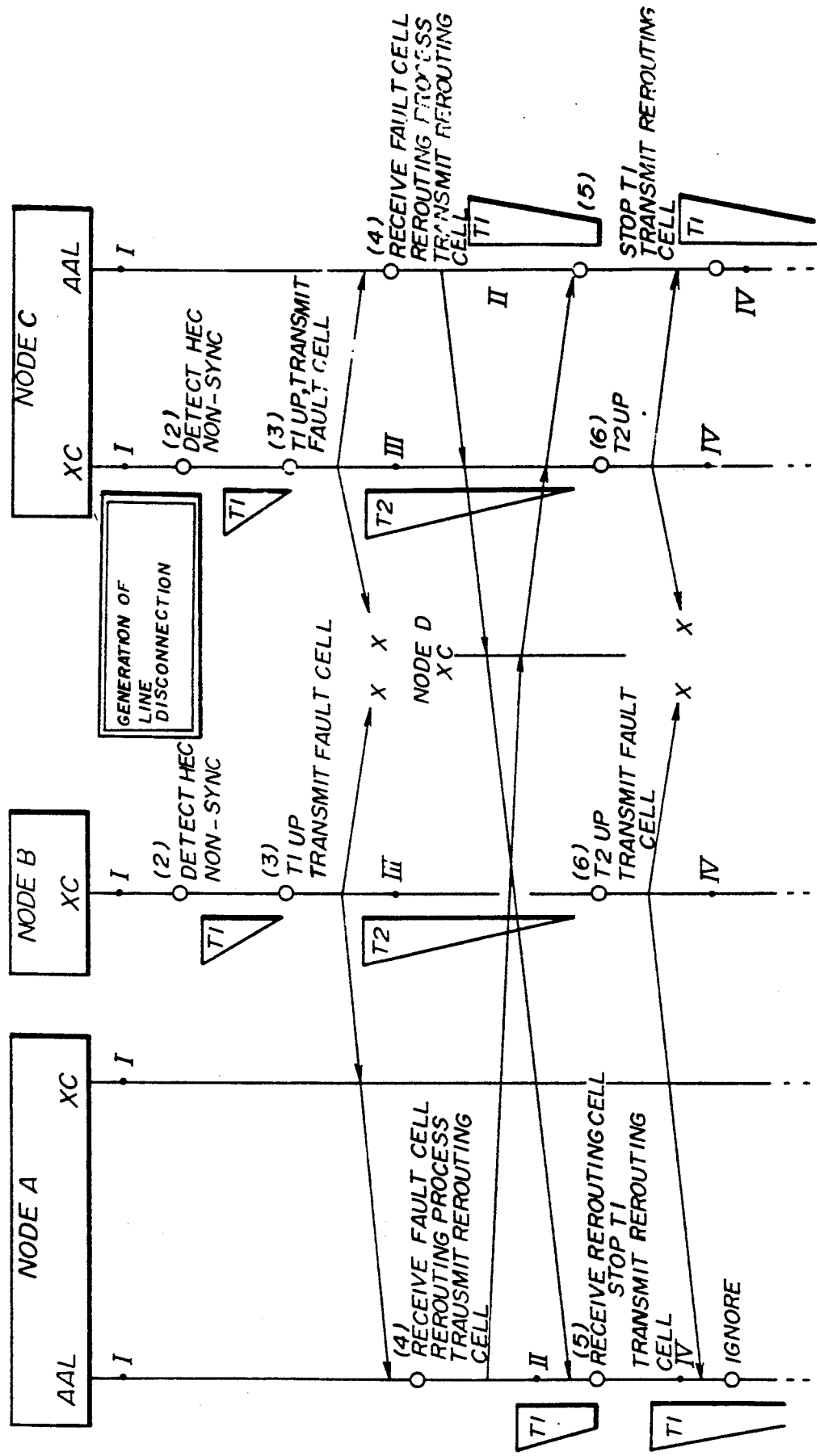
FIG. 25 is a diagram for explaining an operation sequence of each node when a line disconnection is generated.
Figure 26:
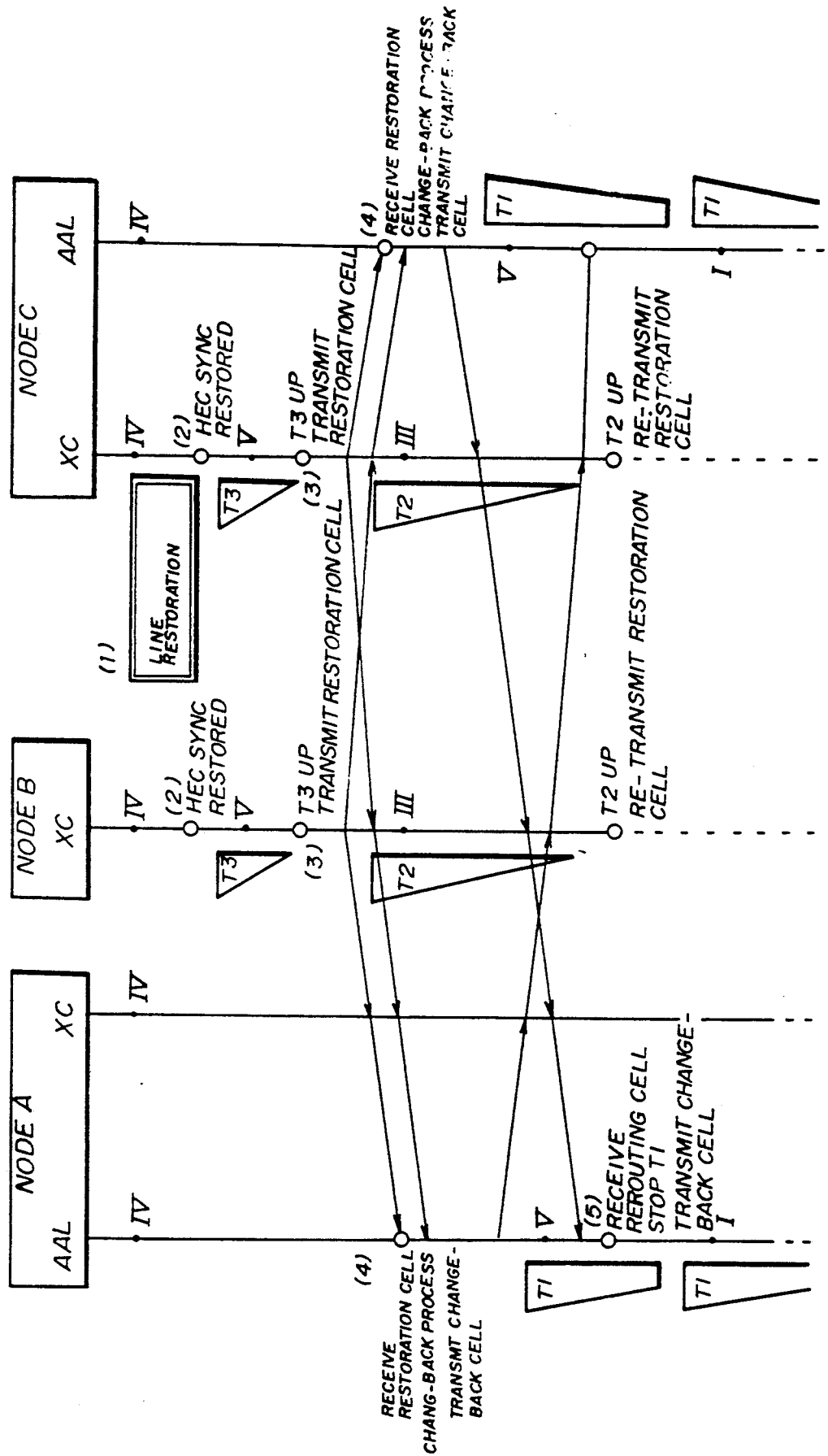
FIG. 26 is a diagram for explaining an operation sequence of each node when a line restoration is made.

Next, a description will be given of an embodiment of the rerouting/change-back system according to the present invention, by referring to FIGS. 22 through 28. FIG. 22 shows an embodiment of a node in this embodiment, and FIG. 23 shows a structure of the ATM cell. FIG. 24 shows an ATM network to which this embodiment may be applied. FIG. 25 is a diagram for explaining an operation sequence of each node when a line disconnection is generated, and FIG. 26 is a diagram for explaining an operation sequence of each node when a line restoration is made. FIG. 27 is a diagram for explaining a state transition of an ATM adaptation layer processing part of each node, and FIG. 28 is a diagram for explaining a state transition of a cross connect part of each node.

The node shown in FIG. 22 includes an adaptation layer and ATM layer (AAL) processing part 102, and a cross connect part 103. The AAL processing part 102 is connected to subscriber lines and carries out an interface processing such as mutual conversion of data from the subscriber side and the ATM cells. In addition, the AAL processing part 102 carries out an interface processing with respect to an ATM switch. The cross connect part 103 is coupled to the AAL processing part 102 and carries out processes including multiplexing, demultiplexing and switching of the ATM cells.

The AAL processing part 102 includes channel processing parts 120, a multiplexer/demultiplexer part 121 and an AAL control part 122. Each channel processing part 120 is made up of a cell assembling part for assembling the data structure into cells, and a cell disassembling part for disassembling the cell structure into data. The multiplexer/demultiplexer part 121 multiplexes and demultiplexes the cells.

The cross connect part 103 includes an ATM switch 130, fault monitoring parts 131 and a cross connect control part 132. Each fault monitoring part 131 is provided in correspondence with one line, and includes a line synchronizing mechanism and an empty (dummy) cell transmitting mechanism. A dotted line i indicates a path of a virtual path or a virtual channel for making a reception to this node or for making a transmission from this node. A dotted line ii indicates a path of a virtual path or a virtual channel passing through this node.

As shown in FIG. 23, the ATM cell has a total of 53 bytes (octets). The first 5 bytes form the ATM header, and the following 48 bytes form the data part. The header includes a virtual path identifier (VPI) which indicates the path which is used, and a virtual channel identifier (VCI) which indicates the channel which is used. In this embodiment, a specific code is inserted into the VCI to indicate the maintenance cell. For example, a 16-bit code "1111000000000000" is inserted into the VCI to indicate the maintenance cell. In the case of the maintenance cell, a code "01" indicating test data is set in bits PT and a value "01" is set in a reserve bit RS and a cell loss priority bit CLP. The header error control (HEC) information is used to check the HEC synchronization, and the line disconnection can be detected when the HEC is not synchronized for N consecutive times.

Out of the 48 bytes of the data part (or information part), the first 2 bytes form an adaptation header, the last 2 bytes form an adaptation trailer, and the 44 bytes between the adaptation header and the adaptation trailer contain the data related to the adaptation layer.

The various notification information which is transmitted by the maintenance cell is indicated by 1 byte of the adaptation header, and the following definitions are used in this embodiment, for example.

| | |
|---|---|
| "Rerouting Cell": | "00000001" |
| "Change-Back Cell": | "00000010" |
| "Fault Cell": | "00000100" |
| "Restoration Cell": | "00001000" |

Next, a description will be given of the ATM network in which the operation sequences shown in FIGS. 25 and 26 are carried out.

In FIG. 24, five nodes A through E are coupled via lines as shown, and each of the nodes A through E include the AAL processing part 102 and the cross connect part 103 shown in FIG. 22. In FIG. 24, the AAL processing part 102 is labelled "AAL" and the cross connect part 103 is labelled "XC". A virtual path VP1 indicated by a solid line is included in the line between the nodes A and B and the line between the nodes B and C. A virtual path VP2 indicated by a dotted line is included in the line between the nodes A and B. In addition, a virtual path VP3 indicated by a one-dot chain line is included in the line between the nodes A and D and the line between the nodes D and C. Furthermore, a virtual path VP4 indicated by a two-dot chain line is included in the line between the nodes B and E.

In the ATM network shown in FIG. 24, it is assumed for the sake of convenience that a fault occurs in the line between the nodes B and C. FIG. 25 shows the operation sequence of the rerouting process when the data is cut off in this case, and FIG. 26 shows the operation sequence of the change-back process when the line fault is restored.

In other words, FIG. 25 shows the operation of the cross connect part 103 of the node B and the operations of the AAL processing parts 102 and the cross connect parts 103 of the nodes A and C for the case where the line between the nodes B and C and including the virtual path VP1 is disconnected. The illustration of the AAL processing part 102 of the node B and the internal parts of the nodes D and E is omitted in FIG. 25 because these parts are not directly related to the rerouting.

The state transitions of the AAL processing part 102 for carrying out the rerouting of FIG. 25 is shown in FIG. 27, and the state transitions of the cross connect part 103 is shown in FIG. 28.

Next, a description will be given of the steps (1) through (6) shown in FIG. 25. In FIG. 25, the Roman numerals I through IV indicate the corresponding states shown in FIGS. 27 and 28.

Step (1): A line disconnection is generated between the nodes B and C.

Step (2): When the non-synchronous state (cell sync-out) of the information HEC is detected in the cross connect part 103 (HEC synchronizing process mechanism of the fault monitoring part) of each of the nodes B and C, the state of the cross connect part 103 changes from a normal state I to a protecting state II shown in FIG. 28 and a timer T1 is started. For example, the timer T1 times a time T1=200 ms.

Step (3): When the line disconnection is not restored within the time T1, the node B investigates the virtual path between the nodes B and C and included in the fault monitoring part of the node B. In this case, it is confirmed that the path VPI is the only virtual path. Accordingly, the node B sends a fault cell (maintenance cell) which notifies the fault to the virtual path VP1 in the directions of the nodes A and C. At the same time, the node B starts a timer T2 to time a time T2. An operation similar to the above is also carried out at the node C.

Step (4): When the AAL processing part 102 of the node A receives the fault cell which is sent at the step (3), it is found that the virtual path VP1 indicated by this fault cell is one of the virtual paths used by the node A. For this reason, the AAL processing part 102 of the node A notifies this to the corresponding channel processing part 120 shown in FIG. 22, so that the VPI value which is mapped in the ATM cell is changed from the normal value to the value at the time of the fault. In this case, the VPI value at the time of the fault is determined beforehand to VP3. Hence, the rerouting path is instructed by the changing of the VPI value. In addition, a rerouting cell (maintenance cell) which notifies other nodes of the process described above is sent to the virtual path VP3 at the time of the fault, and the timer T1 is started.

Step (5): The AAL processing part 102 of the node A receives the rerouting cell which includes the VPI value at the time of the fault and is sent at the step (4). In this state, it is possible to confirm that the AAL processing part 102 of the other node has also made the rerouting operation. For this reason, the timer T1 is stopped and the rerouting is completed. After the rerouting is completed and the time T1 is up, the node A retransmits the rerouting cell. The AAL part 102 of the node C carries out a process similarly to the the AAL part 102 of the node A.

Step (6): After the time T1 is up, the nodes B and C respectively retransmit the fault cell similarly to the step (3). This process is not synchronized to the processes of the steps (4) and (5). In addition, this process is carried out by considering a case where the cell sent at the step (3) is destroyed within the ATM switch 130 of the node B or C.

The rerouting is carried out as described above, while the change-back when the line fault is restored is carried out as shown in FIG. 26. The state transitions of the AAL part 102 and the cross connect part 103 of each node when carrying out the change-back are shown in the latter part of FIGS. 27 and 28.

Next, a description will be given of the steps (1) through (5) shown in FIG.26. In FIG. 26, the Roman numerals I through V indicate the corresponding states shown in FIGS. 27 and 28.

Step (1): The line fault between the nodes B and C is restored.

Step (2): The restored synchronization (restoration from cell sync-out) of the information HEC is detected in the fault monitoring part 131 of the node B between the nodes B and C and in the fault monitoring part 131 of the node C between the nodes C and B. The nodes B and C respectively start a timer T3.

Step (3): When a time T3 of the timer T3 is up, the node B confirms the virtual path included in the fault monitoring part 131 of the node B between the nodes B and C and finds out that the virtual path VP1 is the only virtual path. Accordingly, the node B sends a restoration cell (maintenance cell) which notifies the restored synchronization of the information HEC, that is, the line disconnection restoration, to the virtual path VP1 in the directions of the nodes A and C. At the same time, the node B starts the timer T2.

Step (4): When the AAL processing part 102 of the node A receives the restoration cell sent at the step (3), it is found that the virtual path indicated by this restoration cell is one of the virtual paths used by the node A. For this reason, the AAL processing part 102 of the node A notifies this to the corresponding channel processing part 120 shown in FIG. 22, so that the VPI value which is mapped in the ATM cell is changed from the the value at the time of the fault to the normal value. Hence, the change-back is instructed by the changing of the VPI value. In addition, a change-back cell (maintenance cell) which notifies other nodes of the process described above is sent to the normal (original) virtual path, and the timer T1 is started.

Step (5): The AAL processing part 102 of the node A receives the change-back cell which includes the normal VPI value and is sent at the step (4). In this state, it is possible to confirm that the AAL processing part 102 of the other node has also made the change-back operation. For this reason, the timer T1 is stopped and the change-back is completed. After the change-back is completed and the time T1 is up, the node A retransmits the change-back cell. The AAL part 102 of the node C carries out a process similarly to the the AAL part 102 of the node A.

In FIG. 27 which shows the state transitions of the AAL processing part 102, "REROUTING PROCESS" indicates the changing of the VPI/VCI value to the value in the rerouting state, and "RESTORATION PROCESS" indicates the changing of the VPI/VCI value to the normal value. In addition, "REROUTING CELL" and "CHANGE-BACK CELL" respectively indicate the maintenance cells for notifying the "REROUTING" and "CHANGE-BACK". In FIG. 28, "FAULT CELL" and "RESTORATION CELL" respectively indicate the maintenance cells for notifying the "FAULT" and the "RESTORATION".

According to this embodiment of the rerouting/change-back system, it is possible to realize a high-speed rerouting/change-back which can be completed within a few seconds. Therefore, the rerouting is completed during the re-transmission state of layer 2 (data link layer) particularly in the case of a communication between computers, and a large fault such as a disconnection of a session can be prevented. As a result, the quality of the communication within the network can be improved.

Further, the present invention is not limited to these embodiments, but various variations and modifications may be made without departing from the scope of the present invention.

What is claimed is:

1. A change-back system for an asynchronous transfer mode network in which a rerouting path is set to replace an original path when a fault is generated in the original path within the network, said network including a plurality of communication nodes which are coupled via lines which form original and rerouting paths and communicate information in the form of cells, said original path and said rerouting path coupling first and second communication nodes through the lines within the network, said change-back system making a change-back process to change the path used from the rerouting path to the original path when the fault is corrected, said change-back system comprising:

first means for detecting a restoration of communication when a fault is corrected in the original path;

second means coupled to said first means, for transmitting a cell from the first communication node to the second communication node via each of the rerouting path and the original path when said first means detects the restoration of communication prior to making the change-back process and for measuring a first time for the cell to travel through the rerouting path and a second time for the cell to travel through the original path; and third means coupled to said first and second means, for calculating a guard time which is a difference between the first and second times and for delaying transmission of a cell from said second means to the original path after the restoration of communication, so that the cell after the restoration of communication is transmitted to the original path at least after a time which corresponds to the difference from a time when a cell is last transmitted to the rerouting path immediately before the fault is corrected.

2. The change-back system as claimed in claim 1, wherein said second and third means are included in said first communication node, said third means includes a timer for keeping a present time, and said second means includes means for writing a cell transmission time into the cells which are transmitted to the rerouting path and the original path when said first means detects the restoration of communication and means for measuring the first and second times based on the cell transmission time and the present time kept in the timer.

3. The change-back system as claimed in claim 1, wherein said second means is included in each of said first and second communication nodes, said second means of the second communication node including means for writing a cell reception time into the cells which are received from the first communication node via the original path and the rerouting path, and said second means of the first communication node includes means for writing a cell transmission time into the cells which are transmitted to the rerouting path and the original path when said first means detects; the restoration of communication and means for measuring the first and second times based on the cell transmission time and the cell reception time included in the cell which is returned from the second communication node.

4. The change-back system as claimed in claim 1, wherein said first means detects the restoration of communication based on detecting a synchronization of the receiving of the cells relative to each other.

5. The change-back system as claimed in claim 4 wherein each cell has a header and an information part, and said first means includes means for detecting the restoration of communication based on detecting a synchronization of each of the received cells relative to each other as determined from the header of each of the received cells.

6. The change-back system as claimed in claim 1, wherein said first means detects the restoration of communication based on detecting a synchronization of the receiving of the cells and a receipt of a predetermined maintenance cell relative to each other.

7. The change-back system as claimed in claim 6 wherein each cell has a header and an information part, and said first means includes means for detecting the restoration of communication based on detecting a synchronization of each of the received cells relative to each other as determined from the header of each of the received cells.

8. A rerouting system for an asynchronous transfer node network in which a rerouting path is set to replace an original path when a fault is generated in the original path within the network, said network including a plurality of communication nodes which are coupled via lines forming the original and rerouting paths and communicate information in the form of cells, said original path and said rerouting path coupling first and second communication nodes through the lines within the network, said rerouting system comprising:

first means for detecting a fault in an arbitrary line of the original path between the first and second communication nodes;

second means coupled to said first means, for making a fault notification to all nodes which may send a cell via the arbitrary line of the original path in which the fault is detected by said first means;

third means coupled to said second means, for rerouting a cell which is made via the arbitrary line to use the rerouting path when the fault notification is received; and fourth means coupled to said first and second means, for calculating a guard time difference between a cell traveling through the rerouting path and the cell traveling through the original path, and for delaying transmission of a cell to the original path after the restoration of communication, so that the cell after the restoration of communication is transmitted to the original path at least after a time which corresponds to the difference from a time when a cell is last transmitted to the rerouting path immediately before the fault is corrected.

9. The rerouting system as claimed in claim 8, wherein said first means detects the fault in the arbitrary line of the original path by detecting when cells received via the arbitrary line are out of synchronization relative to each other.

10. The rerouting system as claimed in claim 9, wherein each cell has a header and an information part, and said first means includes means for detecting the fault based on a loss of synchronization of the received cells as determined by the headers of each of the received cells relative to each other.

11. The rerouting system as claimed in claim 8, wherein first means incorporated in one communication node is notified of the fault in the arbitrary line of the original path when a predetermined maintenance cell from second means incorporated in another communication node is received.

12. The rerouting system as claimed in claim 8, wherein said second means makes the fault notification by transmitting a predetermined maintenance cell.

13. The rerouting system as claimed in claim 8, wherein said third means includes a table of paths before and after the rerouting, and said third means resets a call which is made via the arbitrary line to use a rerouting path when the fault notification is received by referring to said table.

14. A rerouting and change-back system for an asynchronous transfer mode network in which a rerouting path is set to replace an original path when a fault is generated in the original path within the network and a change-back is made to change the path used from the rerouting path to the original path when the fault is corrected, said network including a plurality of communication nodes which are coupled via lines forming the original and rerouting paths and communicate information in the form of cells, said original path and said rerouting path coupling first and second communication nodes through the lines within the network, said rerouting and change-back system comprising:

means for detecting a fault in the original path and for determining a restoration of communication through the original path when correction of the fault occurs;

first means coupled to said detecting and determining means, for transmitting to the plurality of communication nodes a maintenance cell which signals a fault when a fault is detected in an arbitrary line of the original path, and for transmitting to the communication nodes a maintenance cell which signals a fault correction when a restoration of communication in the arbitrary line is detected;

receiving means for receiving a maintenance cell that signals when a fault is detected, and for receiving a maintenance cell that signals fault correction resulting from restoration of communication;

second means coupled to said first means and said receiving means, for making the rerouting when a received maintenance cell signals the fault, and for making a change-back to communication through the original path when a received maintenance cell signals the restoration of communication;

third means coupled to said second means, for transmitting a maintenance cell which notifies the rerouting to the communication nodes when said second means makes the rerouting, and for transmitting a maintenance cell which notifies the change-back when said second means makes the change-back; and fourth means coupled to said first means and said detecting and determining means, for calculating a guard time difference between a cell traveling through the rerouting path and the cell traveling through the original path, and for delaying transmission of a cell to the original path after the restoration of communication, so that the cell after the restoration of communication is transmitted to the original path at least after a time which corresponds to the difference from a time when a cell is last transmitted to the rerouting path immediately before the fault is corrected.

15. The rerouting and change-back system as claimed in claim 14, wherein said first means detects the fault and the restoration of communication based on synchronization of the cells which are received relative to each other.

16. The rerouting and change-back system as claimed in claim 14, wherein each cell has a header and an information part, and said receiving means is formed so as to recognize the header of each cell, said means for detecting the fault including means for detecting a loss in synchronization of the received cells as determined by the headers of each of the received cells and for detecting the restoration of communication determined by regaining synchronization of the received cells relative to each other based on the header of each of the received cells.

17. The rerouting and change-back system as claimed in claim 14, wherein each cell has a header and an information part, and information to be transmitted by each maintenance cell is identified by a part of the header.

18. The rerouting and change-back system as claimed in claim 17, wherein said second means makes the rerouting by changing a value of a virtual path identifier within the header of the received cell from an original value corresponding to the original path to a value corresponding to the rerouting path.

19. The rerouting and change-back system as claimed in claim 17, wherein said second means makes the change-back by changing a value of a virtual path identifier within the header of the received cell from a value corresponding to the rerouting path to an original value corresponding to the original path.

* * * * *